US007823739B2

(12) United States Patent  
Sadkin et al.

(10) Patent No.: US 7,823,739 B2
(45) Date of Patent: Nov. 2, 2010

(54) COLLAPSIBLE SHIPPING CONTAINER

(75) Inventors: Howard Sidney Sadkin, Williamsville, NY (US); Lawrence Alan Sadkin, Getzville, NY (US); Martin Jay Sadkin, Getzville, NY (US); Joseph McDonald Lowry, III, Boston, NY (US); Thomas Richard Jones, Queensbury, NY (US); Travis Robert Johnson, Van Etten, NY (US); Thomas Ross Marmon, Fredricksburg, VA (US); Thomas James Miller, Okemos, MI (US); Eric Christopher Schenck, Rochester, NY (US)

(73) Assignee: C Cubed I LLC, Buffalo, NY (US)

( * ) Notice: Subject to any disclaimer, the term of this patent is extended or adjusted under 35 U.S.C. 154(b) by 867 days.

(21) Appl. No.: 11/635,896

(22) Filed: Dec. 8, 2006

(65) Prior Publication Data

US 2008/0135545 A1 Jun. 12, 2008

(51) Int. Cl.
*B65D 88/00* (2006.01)
*B65D 6/00* (2006.01)
(52) U.S. Cl. .............................. 220/6; 220/7; 220/4.28; 220/1.5
(58) Field of Classification Search ................. 220/1.5, 220/4.28, 6, 7; 206/509, 511; 52/79.5
See application file for complete search history.

(56) References Cited

U.S. PATENT DOCUMENTS

| 3,527,339 | A |   | 9/1970  | Cipolla   |       |
|-----------|---|---|---------|-----------|-------|
| 3,570,698 | A |   | 3/1971  | Dougherty |       |
| 3,612,330 | A | * | 10/1971 | Baer      | 220/1.5 |
| 3,765,556 | A | * | 10/1973 | Baer      | 220/1.5 |
| 3,840,135 | A |   | 10/1974 | Bridge    |       |
| 3,966,285 | A |   | 6/1976  | Porch et al. |    |
| 4,019,634 | A |   | 4/1977  | Bonnot    |       |
| 4,577,772 | A |   | 3/1986  | Bigliardi |       |

(Continued)

FOREIGN PATENT DOCUMENTS

DE          2923199         12/1980

(Continued)

OTHER PUBLICATIONS

"Collapsible Shipping Containers—Bulk Boxes—Folding Bin Boxes," Cisco-Eagle, http://www.cisco-eagle.com/storage/containers/collapsible_shipping_containers.htm 2 pages printed from the Internet on Feb. 8, 2005.

(Continued)

*Primary Examiner*—Anthony Stashick
*Assistant Examiner*—Madison L Wright
(74) *Attorney, Agent, or Firm*—K&L Gates LLP

(57) ABSTRACT

A collapsible shipping container includes a floor, a roof, and a pair of bifolding sidewalls, that collapse accordion style to place the sidewalls and roof in a configuration wherein the roof is collapsed onto the sidewalls, and the sidewalls are collapsed onto the floor. The container further includes a pair of end walls having upper and lower end wall sections. The upper end wall sections may be lowered by activation of a power source to lie on the roof in the collapsed configuration. Collapse and erection of the shipping container may be accomplished with the aid of auxiliary equipment, such as a fork lift.

36 Claims, 20 Drawing Sheets

U.S. PATENT DOCUMENTS

| | | |
|---|---|---|
| 4,589,588 A | 5/1986 | Swanhart |
| 4,618,068 A | 10/1986 | Born |
| 4,684,034 A * | 8/1987 | Ono et al. .................. 220/6 |
| 4,848,618 A | 7/1989 | Yuan et al. |
| 4,893,746 A | 1/1990 | Swanhart et al. |
| 4,966,085 A | 10/1990 | Howe |
| 5,190,179 A | 3/1993 | Richter et al. |
| 5,253,763 A | 10/1993 | Kirkley et al. |
| 5,257,830 A | 11/1993 | Pflueger |
| 5,275,301 A | 1/1994 | Clive-Smith |
| 5,289,933 A | 3/1994 | Streich et al. |
| 5,501,353 A | 3/1996 | Warren |
| 5,941,405 A | 8/1999 | Scales et al. |
| 6,006,918 A | 12/1999 | Hart |
| 6,015,055 A | 1/2000 | Bonerb et al. |
| 6,170,689 B1 | 1/2001 | Flesher et al. |
| 6,299,009 B1 | 10/2001 | Ryziuk et al. |
| 6,386,383 B1 | 5/2002 | Roudonis |
| 6,454,148 B1 | 9/2002 | Cook |
| 6,811,048 B2 | 11/2004 | Lau |
| 2002/0084270 A1 | 7/2002 | Metternich |
| 2005/0017001 A1 | 1/2005 | Katz |
| 2006/0043090 A1 * | 3/2006 | Ferrini ..................... 220/6 |
| 2007/0108204 A1 * | 5/2007 | Warhurst et al. ............ 220/6 |

FOREIGN PATENT DOCUMENTS

| | | |
|---|---|---|
| DE | 43 42 366 A1 | 7/1994 |
| DE | 10219709 | 11/2002 |
| GB | 1328378 | 8/1973 |
| NL | 1019921 | 4/2002 |
| WO | WO 02/074642 A1 | 9/2002 |
| WO | WO 03/035492 A1 | 5/2003 |

OTHER PUBLICATIONS

"Collapsible Hand Held Containers," Returnables.com, http://www.returnables.com/ProductsServices/Products/HandHeldContainers/collapsible.htm 2 pages, printed from the Internet on Feb. 8, 2005.
"Ocean Freight Container Sizes," BAS Worldwide Logistics, http://www.bas-hk.com/bas/download/ocontainer.htm, 3 pages, printed from the Internet on Feb. 8, 2005.
International Search Report of PCT/US2007/023722 (5 pages).

* cited by examiner

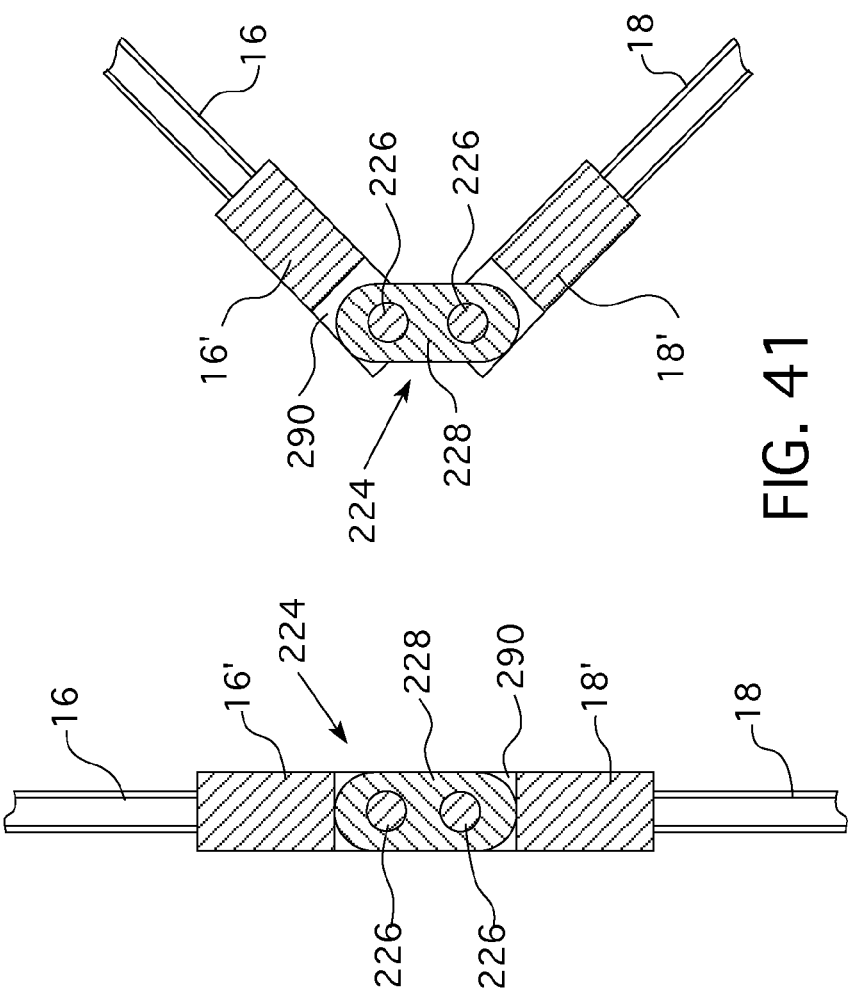

COLLAPSIBLE SHIPPING CONTAINER

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Field of the Invention

The present invention relates to shipping containers and, more particularly, relates to an intermodal shipping container with mechanisms for collapsing and erecting the containers.

2. Background of the Invention

Intermodal transportation refers to the business of transporting containers, either loaded or empty, between cities, countries, and continents by means of semi-trailers, railcars and/or ocean vessels. Transported goods, including everything from electronics to perishables, are generally shipped in intermodal containers for safety and security. Containers used for international transport and domestic transport must pass certification tests of the International Organization for Standardization (ISO) to be deemed sufficient for the rigors of intermodal transportation.

Many ISO classifications exist in today's intermodal transportation framework. An example of particular interest is the 1AA classification, which is the most widely used classification for containers. Containers according to the 1AA classification are 40 ft. (about 12.2 m) in length, 8 ft. (about 2.4 m) wide, and 8.5 ft. (about 2.6 m) high with a loading rate of 67,200 maximum gross pounds. The container tare weight is approximately 6,800 lbs for a non-collapsible container. The containers are handled in ports and drayage yards using special forklifts or cranes and therefore must include specified fittings approved for safe lifting, stacking, and transport.

In an age of constant surveillance against acts of terror and international transport of contraband, ports, railroads and any location traveled by and accessible to trucks are vulnerable security risks worldwide. All intermodal shipping containers entering a country and traveling within that country pose a significant security risk. Containers provide convenient space for storage of weapons and other dangerous or illegal goods.

An increase in security inspections at ports has been on the rise in the past several years. The number of containers entering and leaving major ports every day creates a staggering task for security agencies to inspect each container. However, capacity restrictions at ports of entry and inefficient transportation infrastructures that create bottlenecks associated with the import/export and inland transportation of intermodal containers exacerbates the problem.

It is estimated that more than 50% of all ocean containers entering the United States, for example, are returned to port (or a designated marshalling yard) empty. It is also estimated, for example, that over six million empty containers leave the United States annually. Since an average container will make approximately 7.5 trips from one continent to another by means of an ocean vessel in one year and an average container has a lifespan of seven years, there is a considerable waste of space in shipping empty containers during the useful life of an intermodal container.

Several container designs, including designs for collapsible containers, have been developed, as shown by the following patents: U.S. Pat. Nos. 3,570,698, 3,527,339, 3,996,285, 4,618,068, 4,848,618, 5,190,179 and United States Patent Application 2005/0017001.

Two commercially available collapsible containers have had limited success and acceptance. One such container uses separate removable panels. To collapse the container the panels are removed and stacked on each other using a forklift and a three person crew. The collapsed containers are then stacked six high in the space of a standard 20 ft container. The manufacturer quotes an approximate fifteen minute collapse/erect time. The other commercially available container collapses such that four collapsed containers stack inside a fifth container. The manufacturers reports a collapse/erect time of 10 minutes using two people and a forklift.

SUMMARY OF THE INVENTION

In one aspect, the present invention is a collapsible container which includes a floor, a roof, a pair of end walls connected to the floor, and a pair of sidewalls, each having an upper side panel and a lower side panel hingedly connected to each other. The upper side panel is also hingedly connected to the roof and the lower side panel is also hingedly connected to the floor. The container also includes a locking assembly housed in the roof for locking the container in an erect configuration wherein the sidewalls and the end walls are in a fully upright position. The locking assembly comprises locking members biased in a locked position in which the container is maintained in the erect configuration, and at least one releasing member operatively connected to the locking members for disengaging the locking members. When disengaged, the locking members assume an unlocked position in which the container is movable into a first stage of a collapsed configuration in which the roof is collapsed onto the upper side panels, the upper side panels are collapsed onto the lower side panels and the lower side panels are collapsed onto the floor.

Each end wall may comprise a lower end wall section connected to the floor and an upper end wall section operatively connected to the lower end wall section. In this embodiment, the container may further include a power assembly for moving the upper end wall sections between the erect configuration and a second stage of the collapsed configuration wherein the upper end wall sections are lowered onto the roof following the first stage of the collapsed configuration.

In another aspect of the present invention, the collapsible container includes, in addition to the floor, roof, pair of end walls, and pair of sidewalls having upper and lower side panels, at least one upper hinge connecting the roof to the upper side panel, at least one lower hinge connecting the floor to the lower side panel, and at least one middle hinge on each sidewall connecting the lower side panel of each sidewall to the upper side panel of such sidewall. With this design, the pair of sidewalls may be collapsed accordion style to place the sidewalls and roof in the first stage of the collapsed configuration wherein the roof is collapsed onto the sidewalls, and the sidewalls are collapsed onto the floor.

The upper hinges, lower hinges, and middle hinges are so configured that the container tends to collapse due to gravity when the locking members are disposed in an unlocked position, as described below.

The middle hinge may comprise two substantially parallel and non collinear pins, one pin joined to the upper side panel of the side wall and the other pin joined to the lower side panel of the side wall. The middle hinge also may include a housing forming, in cross section, an elongate oval through which the two pins pass and in which the two pins move freely to allow the upper and lower side panels to move between the erect configuration and the collapsed configuration.

One embodiment of the collapsible container also includes a locking assembly housed in the roof for locking the container in an erect configuration wherein the sidewalls and the end walls are in a fully upright position. The locking assembly includes (i) locking members biased in a locked position, in which the container is in the erect configuration, and (ii) at least one releasing member operatively connected to the locking members for disengaging the locking members to assume an unlocked position in which the container is movable into the first stage of the collapsed configuration. In this stage, the roof is collapsed onto the upper side panels, the upper side panels are collapsed onto the lower side panels and the lower side panels are collapsed onto the floor.

In another aspect of the present invention, the roof includes at least one, and preferably a pair of engaging members, the engaging members being for engagement with auxiliary equipment, such as a pair of tines of a forklift, to lift the roof to place the container in an erect position or to lower the roof to place the container in the first stage of the collapsed configuration described above.

A power assembly is optimally provided for moving the end walls between the erect configuration and the second stage of the collapsed configuration wherein the end walls are lowered onto the roof following the first stage of the collapsed configuration. In one aspect of the present invention, the power assembly is housed in the floor.

In one embodiment of the container of the present invention, the floor has two opposing longitudinal sides and two opposing transverse sides, each being substantially perpendicular to the longitudinal sides. Each longitudinal side of the floor has at least one, and preferably two tracks.

In this embodiment, the container includes a hinge assembly for raising and lowering the upper sections of the pair of end walls. Each said hinge assembly includes an angled hinge, such as a J-hinge, having a first end connection point, a second end connection point and an intermediate connection point. A lever is provided that is connected at one end thereof to the intermediate connection point and slidably connected at the other end thereof to the track in the floor. The lever is further operatively connected to the power assembly. The hinge assembly also may include a mount fixed to at least one of the lower end wall section and the floor, and preferably both. The second connection point is pivotally connected to the mount and the first end connection point is rigidly connected to the upper end wall section.

The power assembly may have power supply lines connected for delivery of power to the lever to move the lever in a desired direction along the track, thereby translating such movement through the angled hinge to the upper end wall section for raising and lowering the upper end wall sections.

The source of power may be external or self-contained. Sources of power include hydraulic, pneumatic, solar power, electric, chemical or electromagnetic. The source of power may be motor driven, for example, by a battery, an electric, gasoline powered, or other fossil or plant based fuel powered motor or engine. In another embodiment, the container may be collapsed manually, preferably with the assistance of auxiliary equipment or tools.

In yet another aspect, the present invention is a method of erecting or collapsing the end walls of a collapsible shipping container. The method includes positioning a mobile power source, for example, a hydraulic or pneumatic power source, adjacent the collapsible shipping container, connecting a pair of power delivery lines from the mobile power source to connectors on the container, activating the mobile power source to supply power to at least one cylinder in the container, the cylinder being operatively connected to the end walls by a hinge assembly, wherein the supply of power actuates the cylinder to move the hinge assembly to raise or lower the end walls onto the roof of the container.

If containers can be collapsed to a compressed, nearly flat configuration when empty, the possibility of hiding illegal or dangerous items in empty containers would be greatly reduced and consequently so would be the number of containers requiring inspection by security agencies. Further, collapsed containers can be stacked on top of each other, thereby taking less space and allowing the transport of more containers, contributing to substantial cost reductions over the lifetime of each container. Collapsed containers significantly reduce the cost that shippers incur when returning empty containers to port. Congestion at ports and railroad capacity constraints can be eased by reducing the number of vehicles (railroad cars and trucks) needed to return empty containers to port by use of the collapsible container described herein. When stacked one on top of another, up to four empty containers occupy the space now occupied by one container, which means that the collapsed containers reduce the occupied volume of empty containers by about 4:1.

Various embodiments of the invention provide solutions to the shortcomings of other collapsible containers. Those of ordinary skill in the art will readily appreciate, however, that these and other details, features and advantages will become further apparent as the following detailed description proceeds.

BRIEF DESCRIPTION OF THE DRAWINGS

The accompanying drawings, which are incorporated in and constitute a part of this specification, illustrate embodiments of the invention, and, together with the general description of the invention given above, and the detailed description of the embodiments given below, serve to explain various principles of the various embodiments of the present invention. Therefore, the present invention may be better understood by reference to the exemplary embodiments shown in the drawings, wherein:

FIG. 40 is a schematic cross-sectional view of an alternative embodiment of the middle hinge of the sidewall when the shipping container is fully erect;

FIG. 41 is a schematic cross-sectional view of the hinge of FIG. 40 connecting the bottom and lower portion of the sidewall when the shipping container is partially collapsed;

FIG. 42 is a schematic cross-sectional view of the hinge of FIG. 40 connecting the bottom and lower portion of the sidewall when the shipping container is fully collapsed; and, FIG. 43 is a perspective view of a stack of four collapsed containers of FIG. 1 adjacent a fully erect container of FIG. 1.

DETAILED DESCRIPTION

An embodiment of the collapsible shipping container of the present invention and component parts thereof are shown primarily in FIGS. 1-15 and 17. Its operation is shown in FIGS. 25-43. The collapsible container shown and described herein may be described from time to time as in compliance with ISO specifications. However, some uses will not require ISO compliance and specific ISO specifications may change from time to time. Thus, the collapsible container of the present invention may depart from ISO specifications without departing from the scope and spirit of the invention.

As used herein, operatively connected or operative contact, means that the components said to be operatively connected or in operative contact, or the like, need not be (but may be) directly connected or in direct contact with each other. Components that are operatively connected or in operative contact may be indirectly connected to each other through intermediate components such that actuation of one component causes a response or reaction in the component to which it is operatively connected or with which it is in operative contact.

The collapsible container of the present invention includes generally a floor, a roof a pair of bifolding sidewalls, a pair of end walls, a locking assembly, and a power assembly. The side walls are structured to collapse, accordion style, upon disengagement of the locking assembly. The pair of end walls are connected by a hinge assembly to the floor and the power assembly to raise and lower at least a portion of each end wall.

Figure 1:
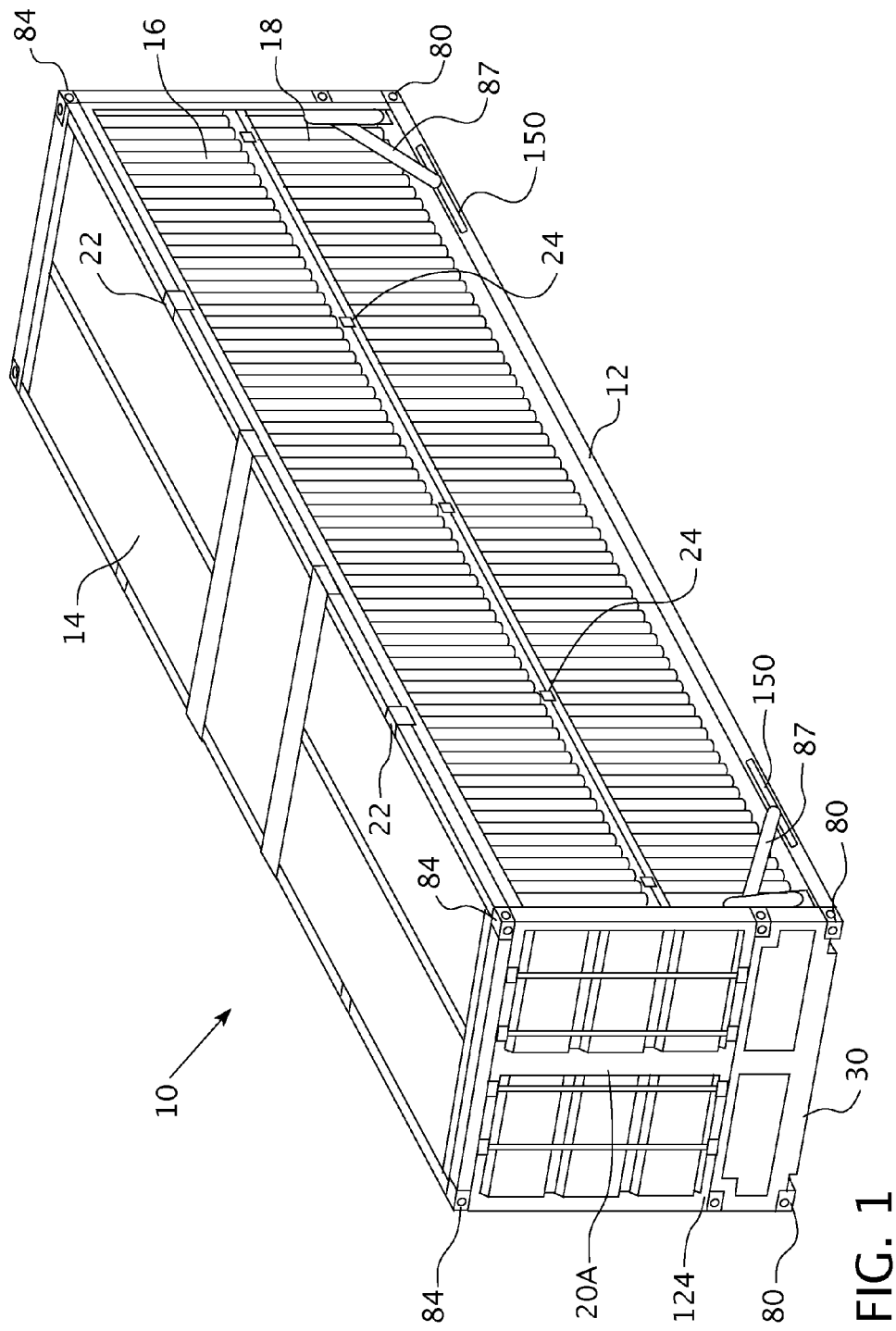
FIG. 1 is a perspective view of a fully erect collapsible shipping container.
Figure 2:
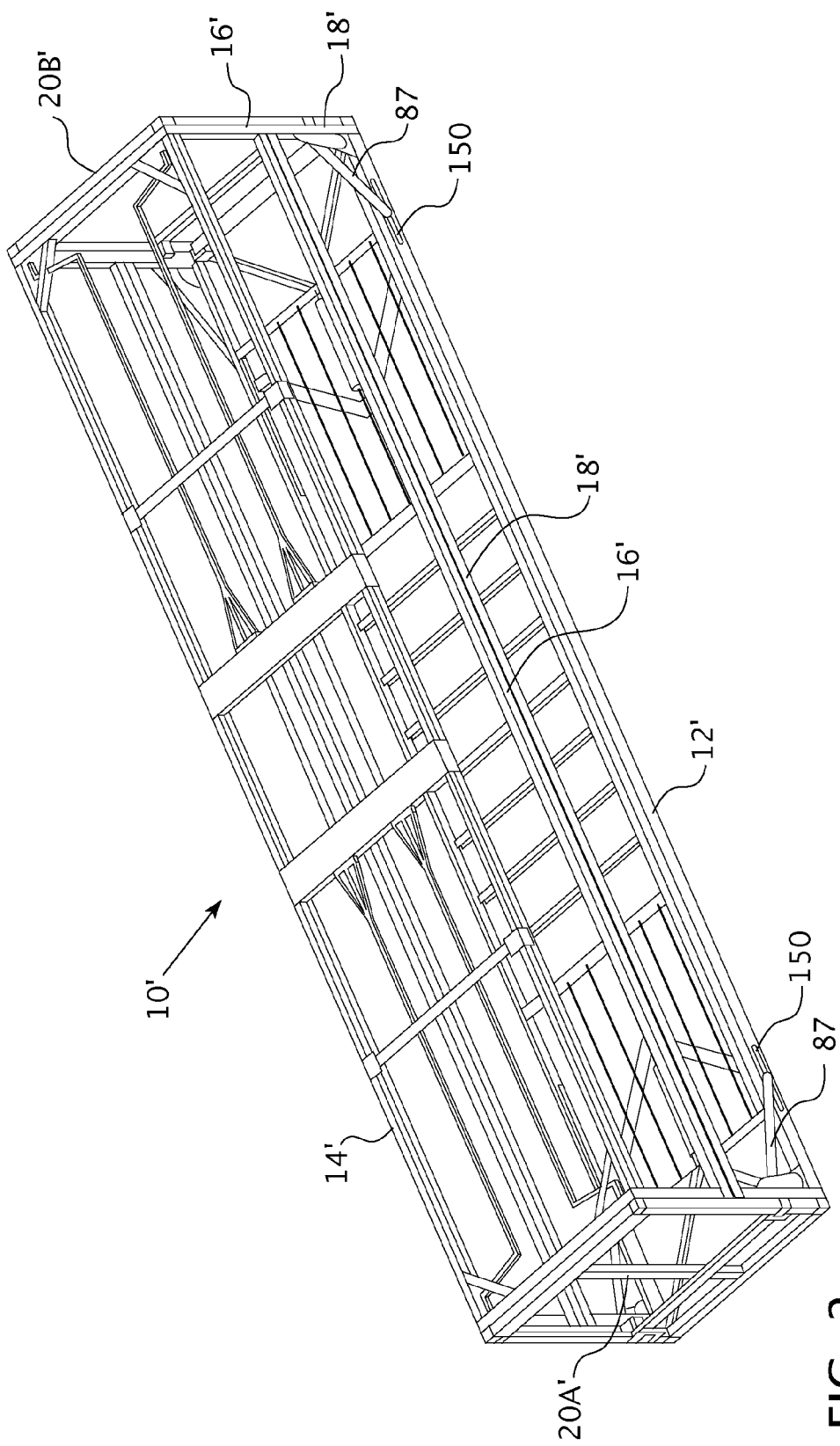
FIG. 2 is a perspective view of the internal framework of the container of FIG. 1.

Turning to the Figures, wherein like numerals denote like components throughout the several views, the collapsible container 10, shown in its fully erect configuration in FIGS. 1 and 2, includes generally frame 10' which provides structure for floor 12, roof 14, pair of side walls 36 and end walls 20A and 20B.

Figure 4:
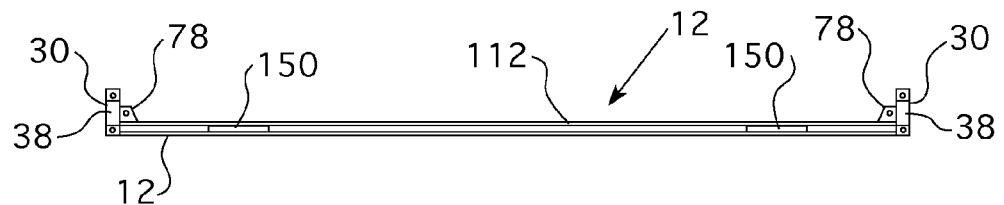
FIG. 4 is a side elevation view of the floor of the container shown in FIG. 3.
Figure 3:
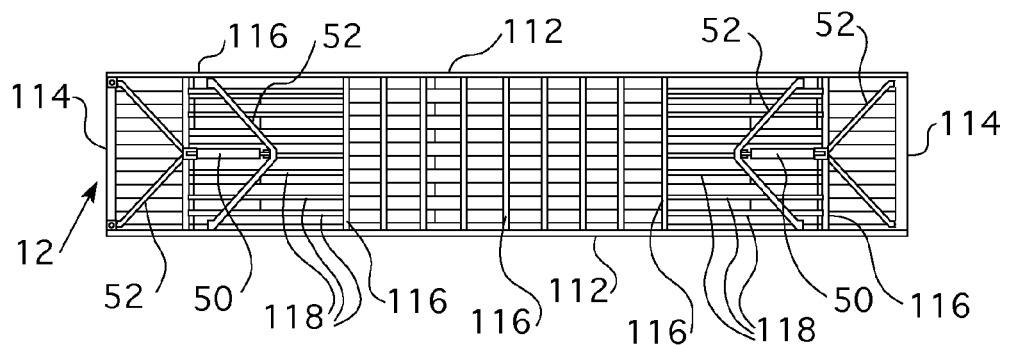
FIG. 3 is a plan view of the floor frame and internal mechanisms of the container of FIG. 1.
Figure 5:
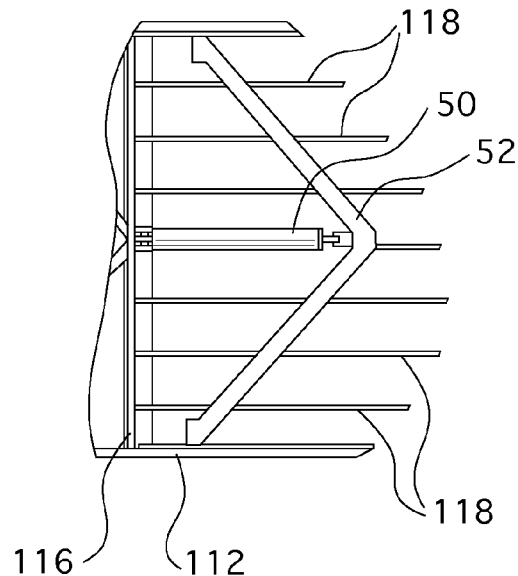
FIG. 5 is a detailed view of the section of the floor showing the cylinder of FIG. 3.

Floor 12, shown in FIGS. 3-5, includes opposing longitudinal perimeter beams 112, such as channel beams, and transverse perimeter end beams 114 or extrusions to define frame 12'. While frame 12' is shown as a rectangular form, those skilled in the art will appreciate that frame 12' may also form a square. Floor 12 includes in addition, a plurality of inner transverse load bearing support beams 116, such as S section I beams or similar structural supports. Five such inner transverse support beams are shown in FIGS. 2 and 3. At each end of floor 12, additional inner longitudinal support beams 118 extend between two transverse inner support beams 116 to provide support for the cylinders 50 and associated supporting braces 52. Seven such inner longitudinal support beams 118 are shown on each side of floor 12 in FIGS. 2 and 3. Depending on the loads to be transported in the container, a different number of inner transverse and longitudinal support beams may be used. The floor structure must be able to support the internal loads and maintain its structural integrity when being lifted, moved and stacked, one container on top of the other. Steel sheeting may be used for the exterior of the floor 12 and multi-ply marine grade plywood may be used for the interior of floor 12. Those skilled in the art will recognize that other materials may be used provided they are sufficiently strong and reliable for the intended loads.

Figure 15:
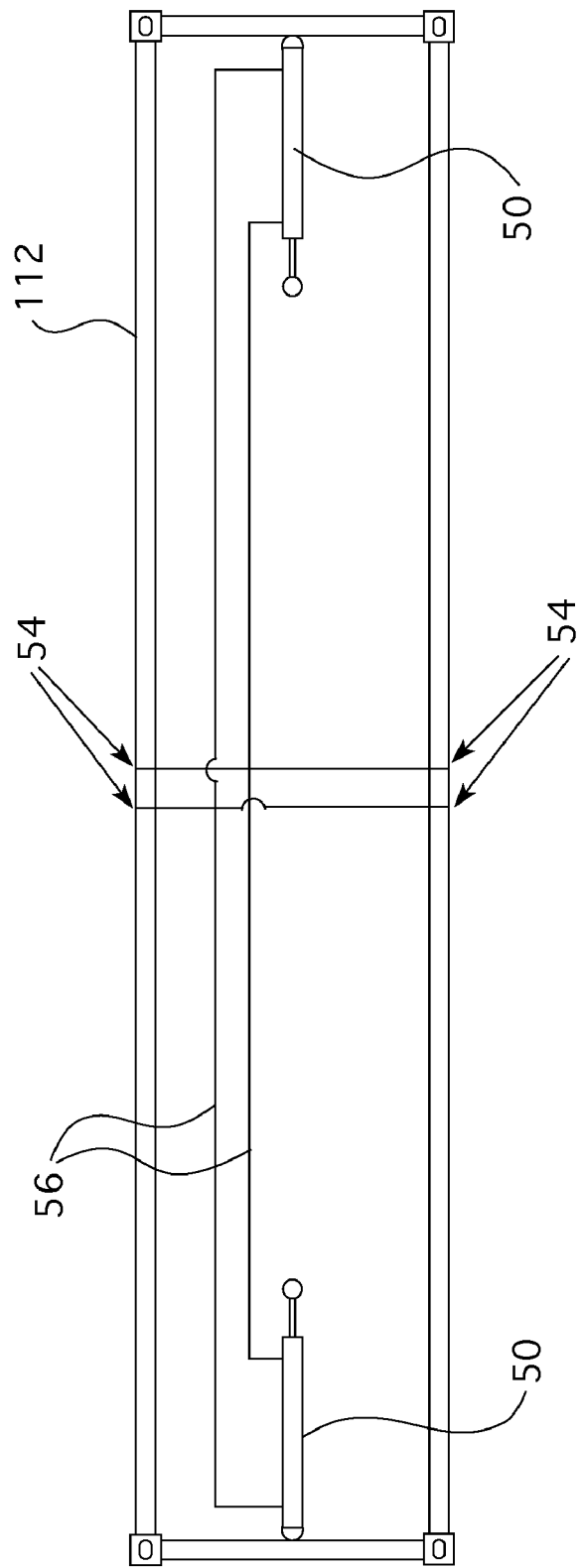
FIG. 15 is a schematic view of the power assembly in the form of a hydraulic system disposed on the bottom of container as shown in FIG. 3.

Referring to FIG. 15, the embodiment of the power assembly shown includes two cylinders 50 plumbed together through power supply lines 56, so as to work in unison from one pair of external power supply/return connections. These power supply/return connections are made through a pair of standard quick connectors 54, such as hydraulic couplings, affixed along the outer edges of the floor 12, preferably at longitudinal perimeter beam 112, shown near the middle of floor 12. In order to minimize the cost of construction of containers 10, the remaining components typically needed in a power supply system are supplied as needed by an external source, such as a forklift or other auxiliary equipment commonly found, for example, at a ship or rail yard.

Figure 16:
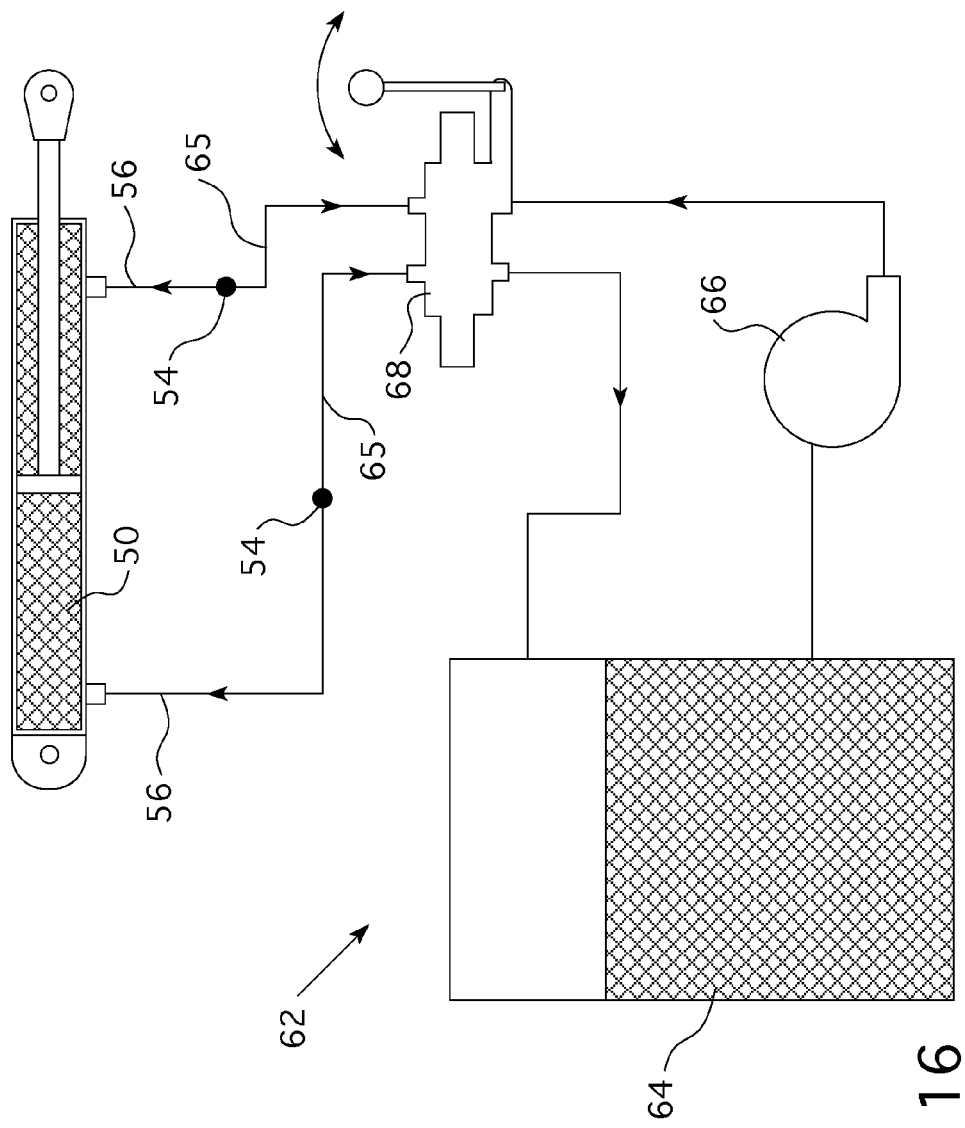
FIG. 16 is a schematic illustration of a mobile hydraulic power source for supplying hydraulic power to the hydraulic cylinders of FIG. 15.
Figure 17:
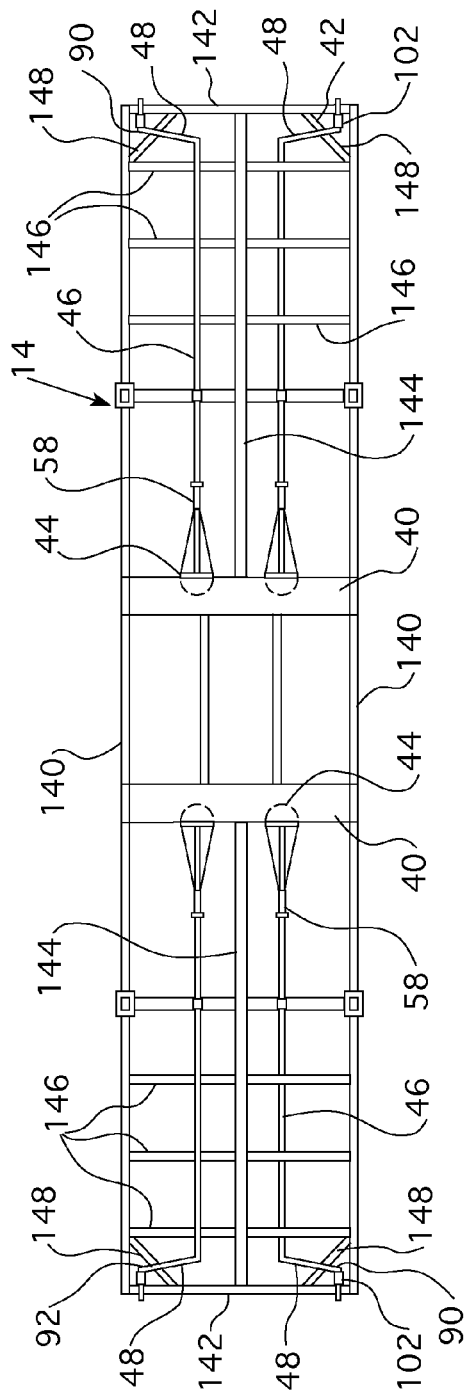
FIG. 17 is a plan view of the frame and internal mechanics of the roof of the container of FIG. 1.
Figure 20:
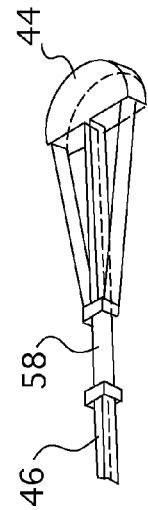
FIG. 20 is a view of the releasing member positioned in the roof of the container for actuating the release of the locking members.
Figure 19:
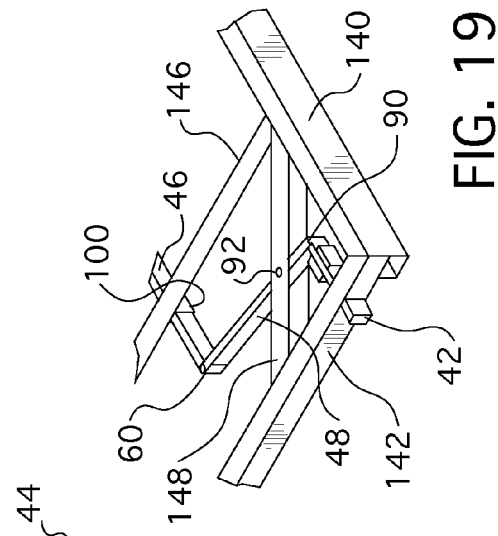
FIG. 19 is a detailed view of another side of the locking assembly of FIG. 18.
Figure 18:
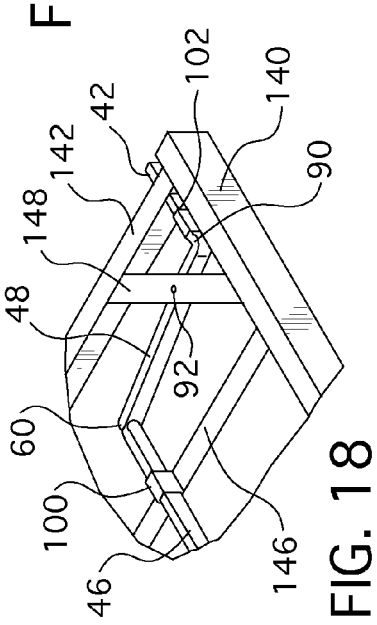
FIG. 18 is a detailed view of one side of a portion of the locking assembly housed in the roof of the container for locking the roof to the end walls.

A basic power supply system may be a hydraulic system 62, as seen in FIG. 16, which is comprised of four main components—a hydraulic fluid reservoir 64, hydraulic pump 66, one or more control valves 68, and the device to be powered, which in this case are the cylinders 50 of container 10. Forklifts of the capacity needed to handle shipments at a port facility typically have two such hydraulic systems onboard to power the primary (vertical) hydraulics which raise and lower the forks, as well as a supplemental set of hydraulics known as a "side-shift" which translates the forks from side to side. The primary hydraulics are necessary for the operation of the container 10, as the forks must be raised and lowered for erecting and collapsing container 10. In one embodiment of the present invention, the forklift's supplemental side-shift hydraulics may be used to power the onboard cylinders 50 of each container 10. In this embodiment, the connectors, such as hydraulic couplings, 54 of container 10 connect to complementary couplings on the forklift, inline with each of the forklift's hydraulic hoses 65 running between the control valve 68 to couplings 54 to and from couplings 54 along lines 56 to hydraulic cylinder 50.

Alternately, some forklifts are equipped with auxiliary hydraulic systems. These provide yet another set of hydraulic ports for use with extra equipment, attachments, etc., but do not have a hydraulic device (such as a hydraulic cylinder) permanently attached for use. If this auxiliary system is available, it would be preferable to use it instead of the side-shift system, for convenience, in order to retain all of the standard functions of the forklift at all times. In this case, quick-connect couplings 54 would be installed onto the hydraulic ports of the auxiliary system if not already so equipped.

Those skilled in the art will recognize that other sources of power may be used to provide energy to power the power assembly of container 10 using readily available power supply components. Examples include hydraulic, pneumatic, solar power, electric, chemical or electromagnetic. The source of power may be motor driven, for example, by a battery, an electric, gasoline powered, or other fossil or plant based fuel powered motor or engine. In another embodiment, the container may be collapsed manually, preferably with the assistance of auxiliary equipment or tools.

Figure 6:
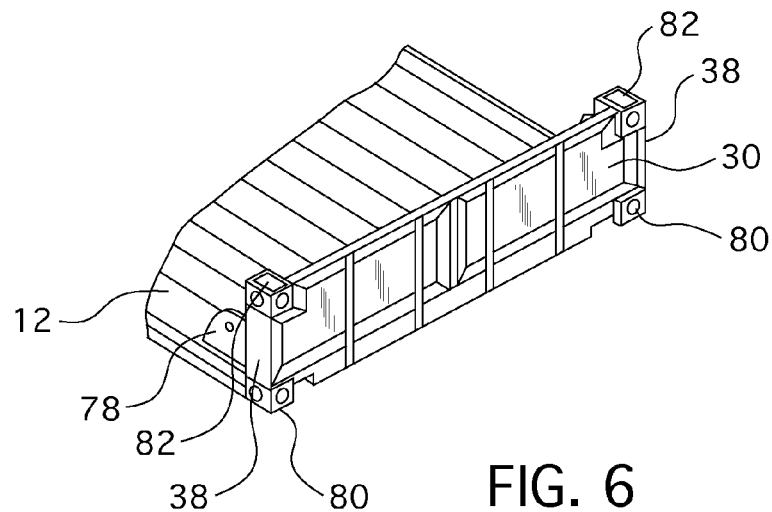
FIG. 6 is a detailed section view of one end of the floor shown in FIG. 3.
Figure 7:
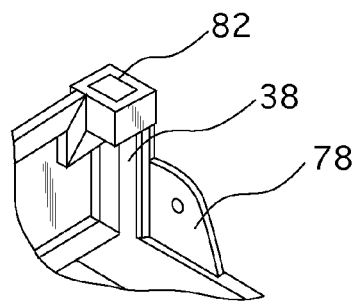
FIG. 7 is a detail section view of a corner post of the view of FIG. 6.
Figure 8:
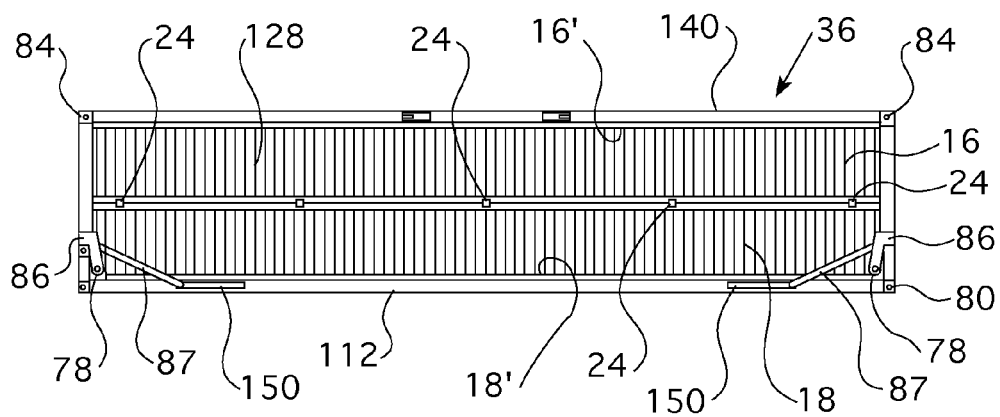
FIG. 8 is a side elevation view of the container of FIG. 1.

At each end of floor 12, extending upwardly from the transverse perimeter end beams 114 generally at a right angle, is an upright end wall section 30 that forms a lower part of the end walls 20A or 20B. See FIGS. 4, 6 and 7. Corner posts 38 are provided as part of frame 10' for structural support. A plate 78 or similar mounting member may be rigidly attached at each corner between the sides of each end wall sections 30 and the ends of longitudinal perimeter beams 112. The bottom of the end wall sections 30 may be connected by any suitable means to the perimeter end beam 114, such as by welding, or may be integrally formed therewith. In one embodiment, ISO corner fittings 80, 82, such as those shown in FIGS. 6-8, are fixed at the tops and bottoms of corner posts 38, respectively, to provide ISO fittings for maneuvering the container 10 at all four corners of the floor 12 and at all four corners of what will be the top of container 10, the top edges of end wall sections 30, when container 10 is in its fully collapsed configuration. These fittings are employed for lifting the loaded container by cranes or other means. Shipping container 10 may be lifted either from the four ISO fittings 80 at its bottom four corners, or from the four ISO fittings 84 at its top four corners.

Figure 9:
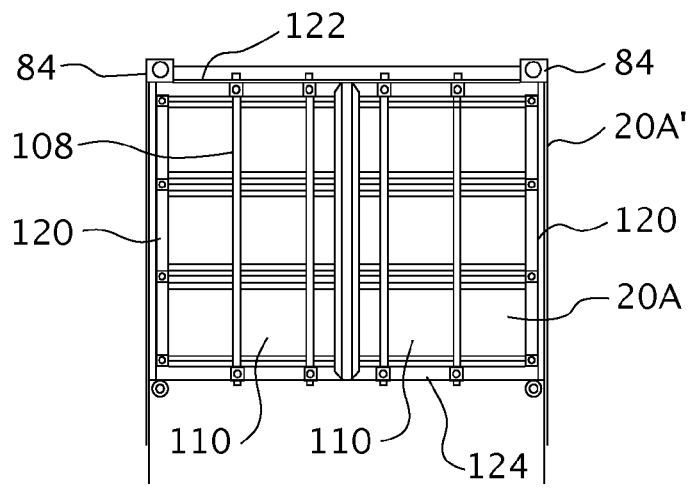
FIG. 9 is a view of an end wall of the container of FIG. 1 with doors.
Figure 10:
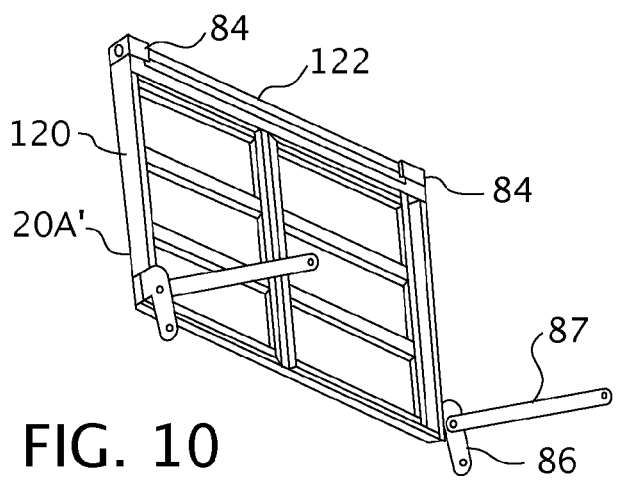
FIG. 10 is a perspective view of the end wall of FIG. 9 showing the hinges for connection to the bottom.
Figure 11:
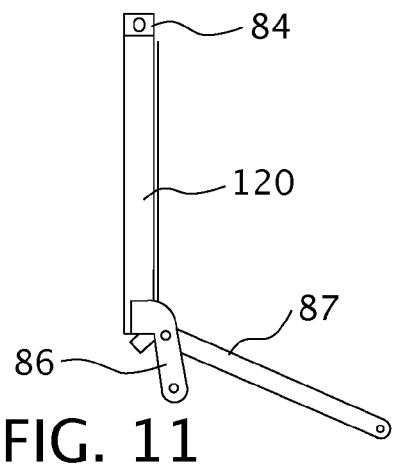
FIG. 11 is a side view of the end wall of FIGS. 9 and 10.

End wall 20A, shown in FIGS. 9-11, includes a frame 20A' having side posts 120, a top cross member 122 and bottom support member 124, doors 110, and additional supports 108. Bottom support member 124 rests on and is aligned with the top edge of one of the end wall sections 30. The interior side of end wall 20A will, when fully erect, form the interior end wall of container 10. Top cross member 122 includes at least two openings on the interior side thereof for engaging locking members 42 of a set of locking mechanisms housed in roof 14, which will be described in more detail below.

A hinge assembly joins floor 12, end wall sections 30 and end walls 20A and 20B and facilitates movement of end walls 20A and 20B during the collapsing or raising operations, described in more detail below. The hinge assembly, positioned at the corners of the end walls, includes angled hinges, such as J-hinges 86, mounting members, such as plates 78, and levers 87. J hinges 86 have a first, short section that curves into a second, longer section. One J-hinge is connected at the end of its short section to each bottom end of the side posts 120. At an intermediate point, for example, at its curved portion, J-hinges 86 are pivotally connected to one end of a lever 87. Lever 87 is slidably connected at its opposite end to a track 150 on the longitudinal perimeter beam of floor 12. The end of the second, longer section of each J-hinge is pivotally connected to plate 78, which as described above is connected to end wall section 30. When actuated by the power assembly, such as by cylinders 50, which will be described more fully below, lever 87 slides along track 150, pulling or pushing the short end of J-hinge 86 and with it end walls 20A and 20B to collapse and raise, respectively, end walls 20A and 20B. ISO corner fittings 84 as described above and shown in FIGS. 9-11 are fixed at the juncture between each side post 120 and the top cross member 122.

Figure 12:
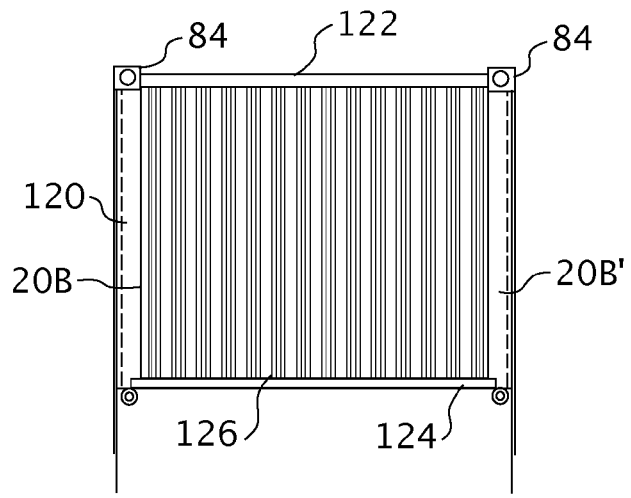
FIG. 12 is a view of a solid end wall of the container of FIG. 1.
Figure 13:
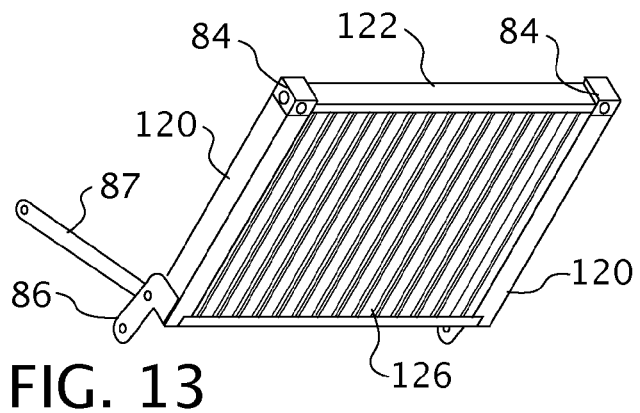
FIG. 13 is a perspective view of the end wall of FIG. 12.
Figure 14:
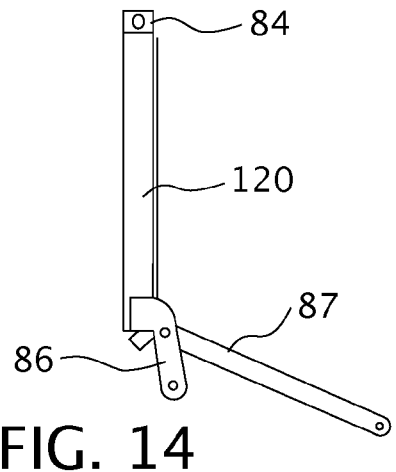
FIG. 14 is a side view of the end wall of FIGS. 12 and 13.

End wall section 20B, shown in FIGS. 12-14, includes a frame 20B' having side posts 120, a top cross member 122 and bottom support member 124, and a center panel 126. J hinges 86 are connected in the manner described above to each bottom end of the side posts 120, to levers 87 and to plates 78. The opposite ends of levers 87 are slidably connected to tracks 150, as described above. ISO corner fittings 84 as described above and shown in FIGS. 12-14 are fixed at the juncture between each side post and the top cross member. As with the corresponding components of end wall section 20A, top cross member 122 of end wall 20B includes at least two openings on the interior side thereof for engaging locking members 42 of a locking assembly housed in roof 14.

Container 10 has two side walls 36 that span the area between perimeter beams 112 on each side of floor 12 to the corresponding longitudinal perimeter beam 140 of roof 14. One representative side wall 36 is shown in FIG. 8. Each side wall 36 includes upper and lower sections 16 and 18, respectively. Each upper section 16 includes a frame 16' and panels 128. Each lower section 18 includes a frame 18' and panels 128. The frames 16' and 18' each include top and bottom longitudinal beams and two transverse end beams. The top longitudinal beam of the lower frame 18' is connected to the bottom longitudinal beam of the upper frame 16' by at least one hinge, and preferably a plurality of hinges 24. Five hinges 24 are shown in FIG. 8, but more or less may be used provided the upper and lower sections 16, 18 are adequately secured to each other during all operations of the container 10.

Figure 23:
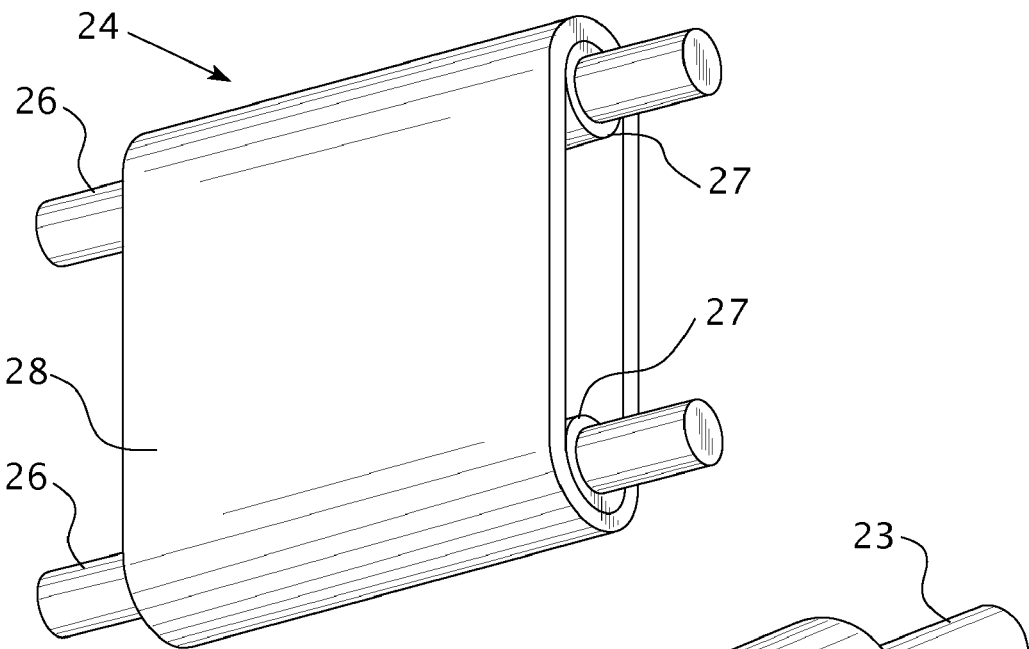
FIG. 23 is a perspective view of the middle hinge between upper and lower panel sections of the side walls.
Figure 24:
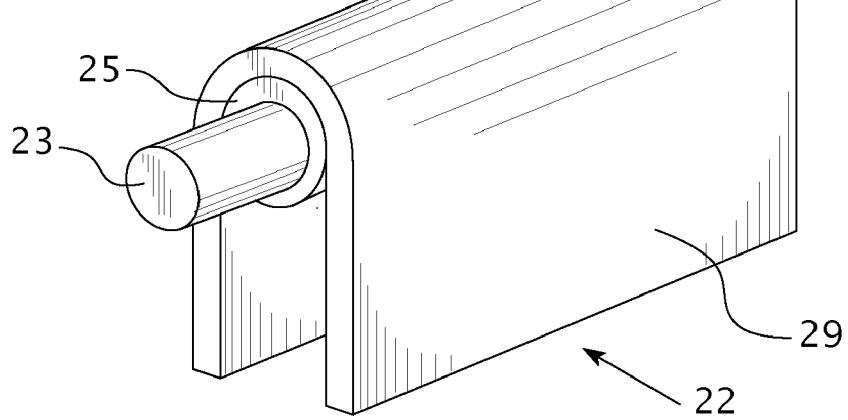
FIG. 24 is a perspective view of the hinge used to connect the roof and floor of the container to the upper and lower panel sections, respectively, of the side walls of the container.
Figure 22:
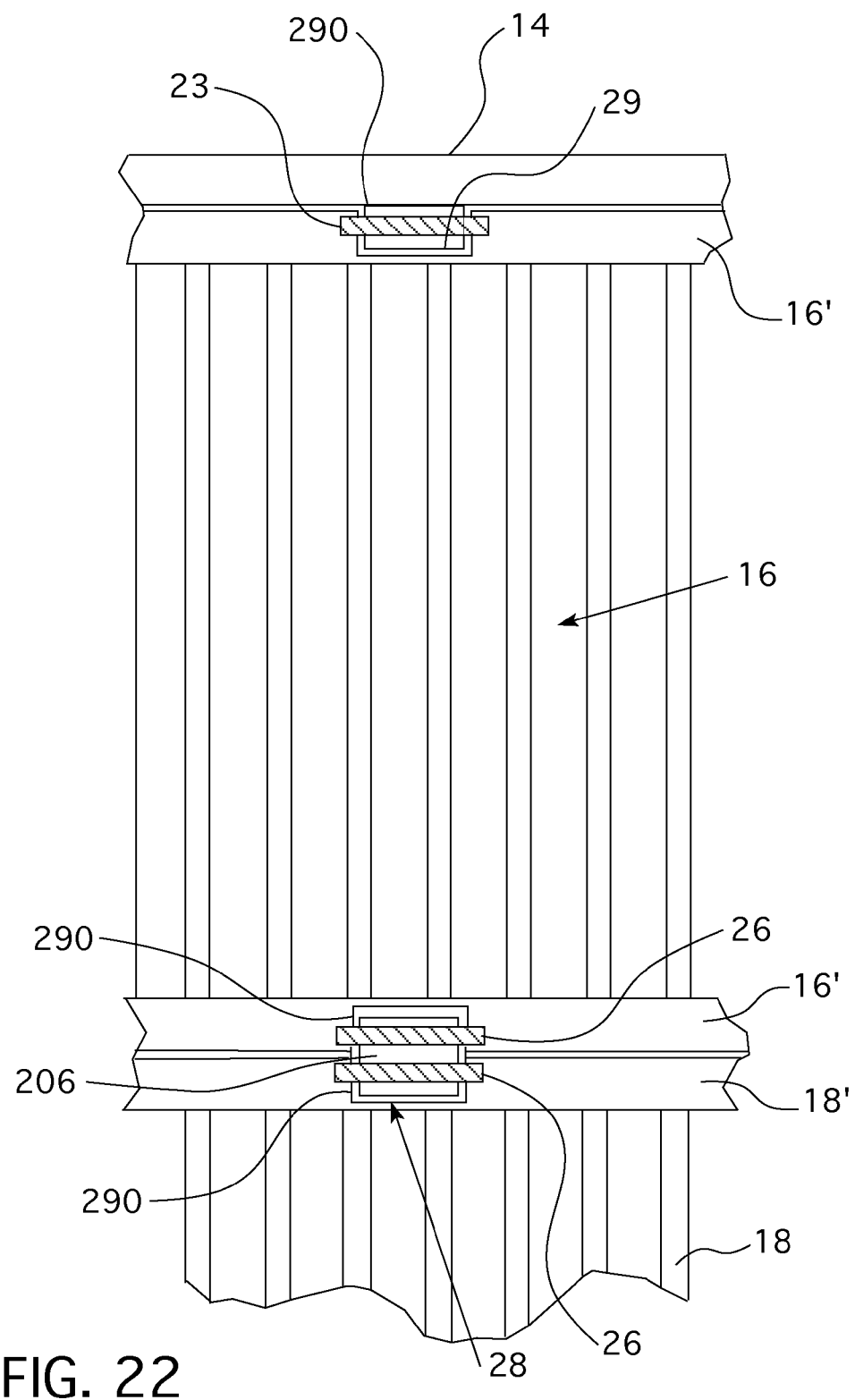
FIG. 22 is a cut away view of a portion of the upper and lower side wall sections showing upper and middle hinges notched into the side wall frames.

Hinge 24 is shown relative to frames 16' and 18' in FIG. 22 and in a perspective view in FIG. 23. It includes two pins 26 and a full shackle member 28. The pins 26 float within the shackle 28 to adjust for changes in the distance between the upper and lower side wall sections as the side walls move between the erect and collapsed configurations. Shackle 28 forms, in cross-section, an elongate oval in which the pins move freely as needed to allow said upper and lower side panels to move between the erect configuration and the collapsed configuration. In one embodiment, the pins 26 are joined to a notch or similar member cut or set into the top and bottom longitudinal beams of frames 18' and 16', respectively. Pins 26 may be driven into the beam, welded, glued, or fastened to the beam, for example, with a screw, nut or cotter pin.

Each lower side wall section 18 is connected along its bottom longitudinal beam to a longitudinal perimeter beam 112 of floor 12 by at least one, and preferably a plurality of hinges 22. In the embodiment of container 10 shown in FIG. 1, there are preferably five hinges 22 on each side connecting each lower wall section 18 to a long side of floor 12. Each upper section 16 is connected along its top longitudinal beam to a longitudinal perimeter beam 140 of roof 14 by at least one, and preferably a plurality of hinges 22, as shown schematically in FIG. 22. In the embodiment of container 10 shown in FIG. 1, there are preferably five hinges 22 on each side connecting each upper wall section 16 to a longitudinal perimeter beam 140 of roof 14.

Hinge 22 includes a pin 23 and an open, partial shackle member 29. The "open" end of partial shackle member 29 is joined, such as by welding, to the perimeter of the floor and the perimeter of the roof before assembly. Pins 23 are joined to a notch or similar member cut or set into the lower edge of the bottom beam of frame 18' of the lower side panel and the upper edge of the top beam of frame 16' of the upper side panel as described above for pins 26.

Figure 21:
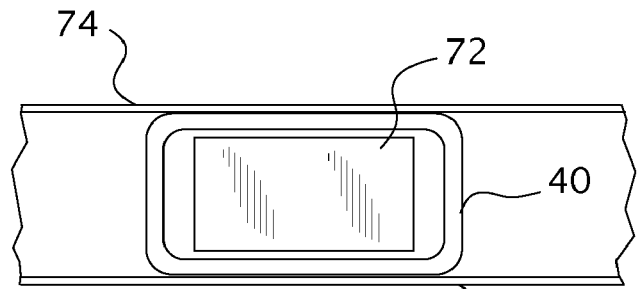
FIG. 21 is a cross sectional view of the engaging member of the container and a tine of a fork truck.

Roof 14 includes a frame 14' (see FIGS. 2 and 17) having longitudinal perimeter beams 140, transverse perimeter beams 142, inner longitudinal supports 144, inner transverse supports 146 and corner braces 148 to provide a rigid and sturdy construction. Intermediate the transverse perimeter beams 142, preferably towards the center of roof 14, are two fork engaging members 40. Preferably, as shown in cross section in FIG. 21, the fork engaging members 40 are rectangular tubes or channels dimensioned to receive the tines 72 of fork lift 70.

Any suitable material may span the frame 14' to enclose the roof, such as a sheet metal skin, steel panels, composite materials or any material that will contribute to the longitudinal rigidity of container 10. Preferably, roof 14 includes an external panel 74 and an internal panel 76. See FIG. 21. The components of the locking assembly described above is housed between the panels 74, 76 and is thereby shielded from damage or interference by the contents of container 10 or any thing external to container 10.

For most shipping applications, the materials for the roof, floor, side and end walls must be water tight and corrosion resistant. Suitable seals, such as seals having a hollow D-shaped configuration, are preferably provided along each exposed edge of container 10, such as the edges between the longitudinal perimeter beams and the upper side walls, the edges between the upper and lower side walls, the edges between the lower side walls and the longitudinal perimeter beams of the floor 12, the edges between the side posts of end walls 20A and 20B and sidewalls 36 and the edges between the doors 110 of end wall 20A. In addition, flap seals may be provided.

The embodiment of roof 14 which is shown in FIGS. 17-20, 25 and 26 houses a locking assembly for locking roof 14 to end walls 20A and 20B. The locking assembly includes generally four sets of locking mechanisms, one preferably positioned generally at or adjacent each corner of roof 14. Each set includes locking members and releasing members. A releasing member, shown in one embodiment of the collapsible container as plunger 44, protrudes through an opening in the side of engaging member 40. The plunger 44 is connected by a bias member, or spring 58, to lock connector 46, which in turn is pivotally connected to pivot arm 48, which is pivotally connected to locking member 42. Lock connectors 46 pass from plungers 44 and springs 58 through brackets 100 on transverse supports 146 to pivot arms 48. Lock members 46 are pivotally connected to one end of pivot arms 48 at joints 60. The opposite end of pivot arms 48 are pivotally connected at joints 90 to locking member 42. A pivot pin 92 passes through corner brace 148 and engages pivot arm 46 so that pivot arm 46 is free to pivot about pin 92 when pivot arm 46 is moved. Locking members 42 pass through a guide 102 to align locking members 42 with openings through the transverse perimeter beams 142 and top cross members 122 of end walls 20A and 20B, when container 10 is in the fully erect, locked position. Spring 58 biases each lock connector 46 inwardly to maintain the locking mechanism in the locked position.

Figure 25:
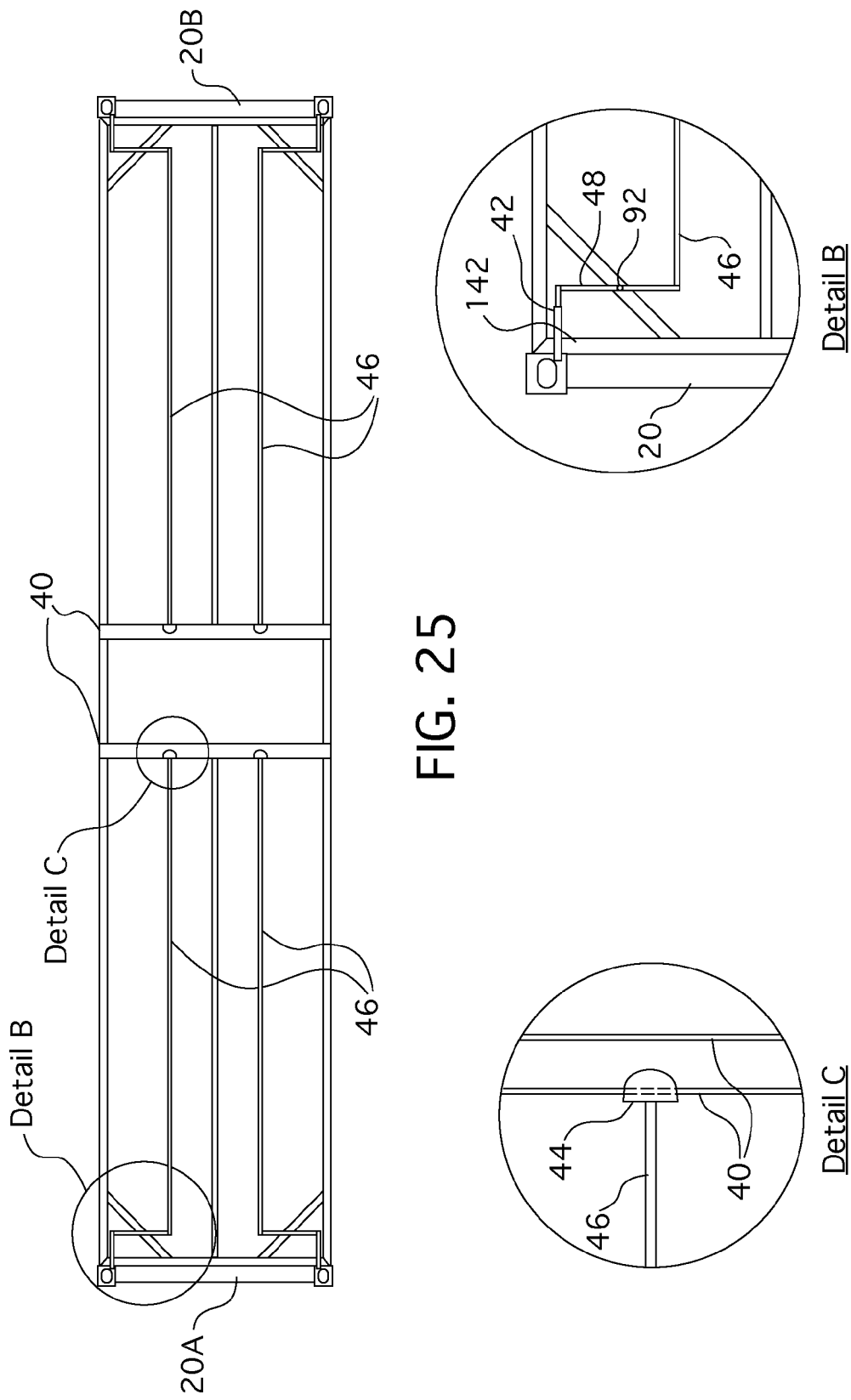
FIGS. 25 A-C illustrate the locking assembly of FIGS. 17-19 in the locked position.

FIGS. 25 A, B and C show, schematically, an embodiment of the locking mechanism in the locked position. FIGS. 26A, B and C show, schematically, the same locking mechanism in the unlocked position. The releasing member, in this embodiment in the form of plunger 44, is configured such that, when complementary engaging portions of auxiliary equipment found in a rail yard or port, such as the tines 72 of a fork lift, are inserted into engaging member 40 and meet plungers 44, the smooth convexly curved edges of plungers 44 allow the tine 72 of the fork lift to push the plungers 44 outwardly, through the opening in the side of engaging members 40 towards the end beams 142 of roof 14. The force applied by tines 72 to plungers 44 pushes connector 46 back causing pivot arm 48 to bend at joints 60 and 90 and pivot about pivot pin 92, to pull locking member 42 inwardly, out of engagement with the top cross members 122 of end walls 20A and 20B, thereby unlocking the roof 14 from the end walls 20 A and 20B.

FIG. 25 B illustrates a plunger 44 protruding through the wall of one of the engaging members 40. FIG. 25 C illustrates the locking member 42 engaged within a top cross member of end wall 20 to lock the roof 14 and end walls 20 together, thereby preventing roof 14 from moving into the collapsed configuration. Pivot arm 48 may be positioned at about a right angle with respect to connector 46 and locking member 42 when in the locked position.

Figure 26:
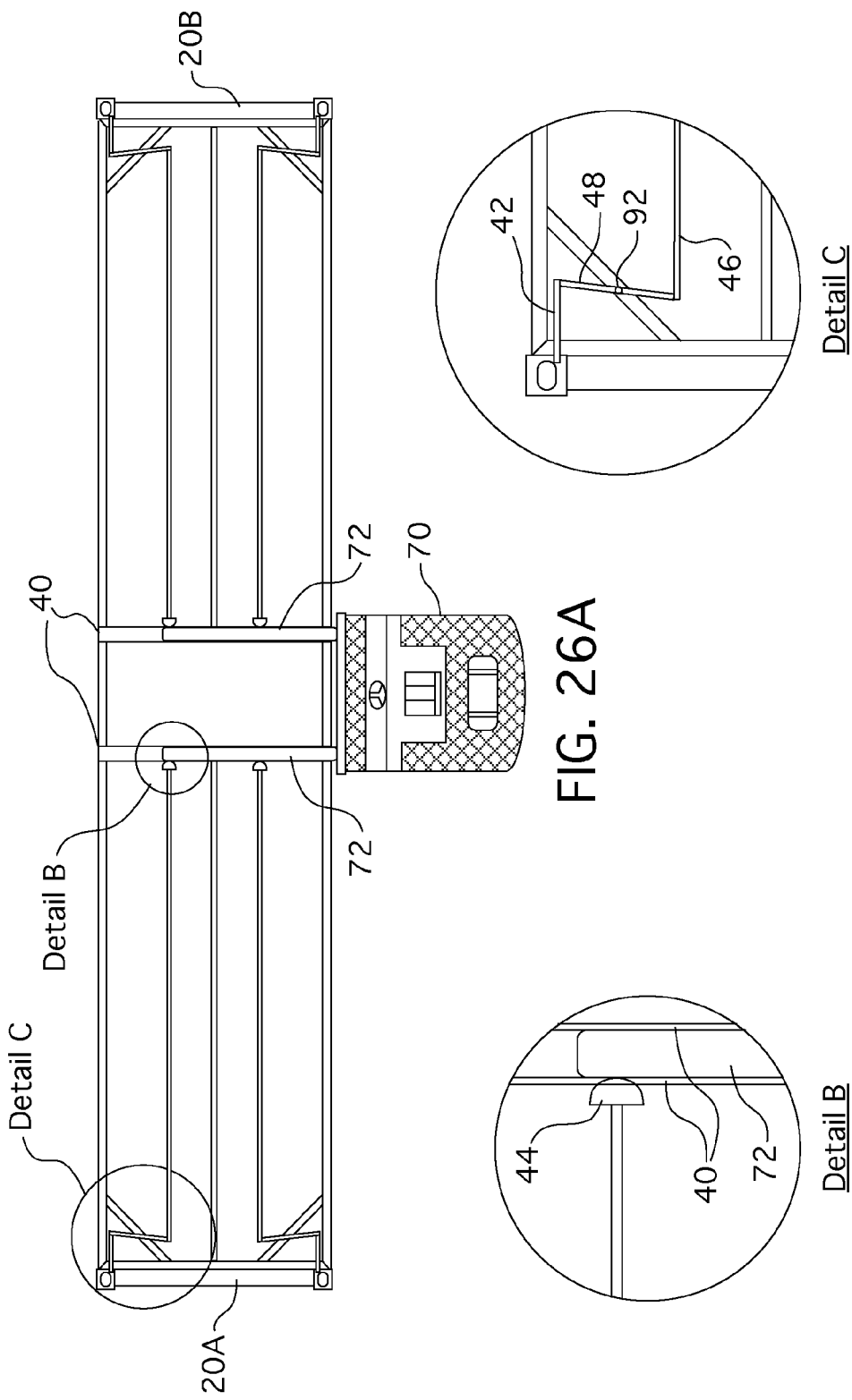
FIG. 26A with Details B and C illustrate the locking assembly of FIGS. 17-19 in the unlocked position.

FIG. 26 schematically illustrates a fork truck 70 having tines 72 engaging the engaging members 40 of container 10. Detail B of FIG. 26 shows plunger 44 pushed inwardly, in this set of the locking mechanism to the left, by tine 72. Detail C of FIG. 26 shows the locking member 42 disengaged from the top cross member of an end wall 20 and pivot arm 48 pivoted about pin 92 such that, in the unlocked position, the angles formed at joint 60 between pivot arm 48 and connector 46 and at joint 90 between pivot arm 48 and locking member 42 are more acute. With this arrangement, the fork truck is enabled to engage the roof 14 to unlock the roof 14 from the end walls 20 and simultaneously support roof 14 to enable a gentle collapse of the container 10.

The convexly curved ends of the plungers are positioned within the engaging members 40 such that both forks must be fully inserted for all four locking members 42 to be retracted out of the end posts. Preferably, the engaging members 40 and plungers 44 are so configured that the fork truck 70 can engage the container 10 from either side. As described above, the locking members 42 and lock connectors 46 are preferably spring biased toward a locking position. Hence, when a collapsed container 10 is to be erected, after the end walls 20A and B are erected by actuation of the power assembly, auxiliary equipment, such as a fork truck 70 approaches the container 10 from either side and slides its engaging portions, in this embodiment, in the form of tines 72, into the engaging members 40 and lifts the roof 14 to its fully erect position. Then, the fork truck 70 is reversed to withdraw the tines 72 from engaging members 40. As this is done, the bias exerted by spring 58 on the locking members 42 causes them to engage the end walls 20A and B to lock the container 10 in its erect configuration, as illustrated in FIG. 1.

Figure 27:
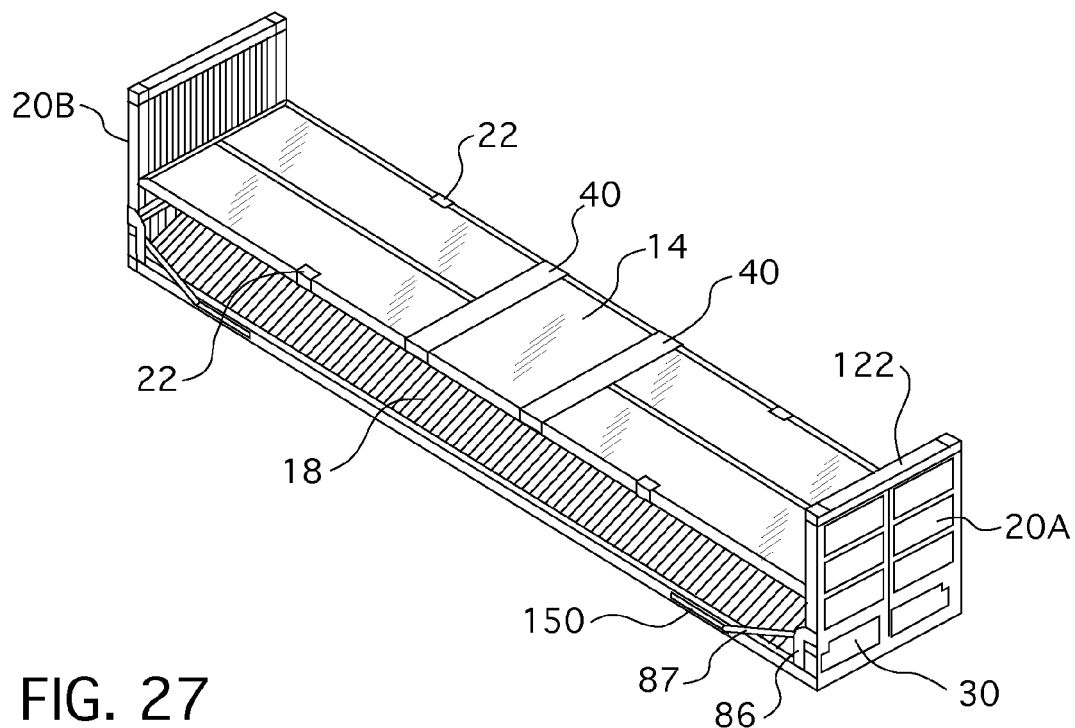
FIG. 27 is a perspective view of the container of FIG. 1 in a partially collapsed configuration.
Figure 28:
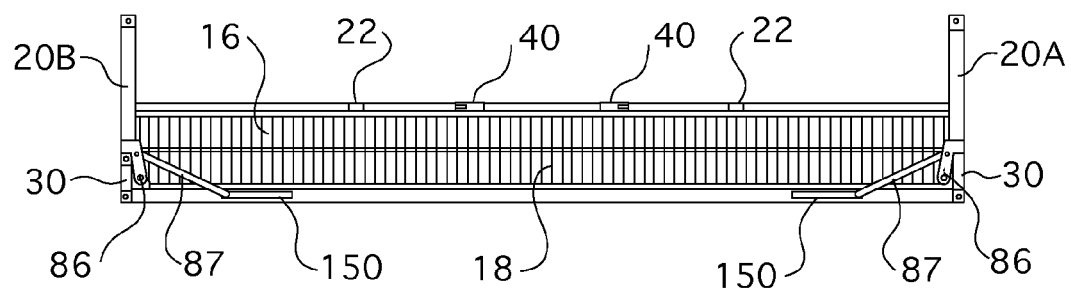
FIG. 28 is a side elevation view of the partially collapsed container of FIG. 27.

FIGS. 27 and 28 illustrate the collapsible shipping container 10 as it is being collapsed to the first stage of the collapsed configuration. After the roof 14 is unlocked from end walls 20A and 20B as described above, the upper side panels 16 (on each of the long sides) and the lower side panels 18 can be lowered by being folded inwardly, accordion style. As this happens, the roof 14 is moved downwardly by available auxiliary equipment, such as a fork truck or a crane. At this stage of the collapse, the end walls 20A and 20B remain standing vertically.

After the engaging portions of the auxiliary equipment, for example, the tines or forks of a fork truck, are inserted in the engaging members 40, the fork lift operator uses the familiar primary hydraulic controls found on the forklift control panel to lower the forks, roof 14, and side wall 36 just as any other object would be lowered using a forklift.

Figure 29:
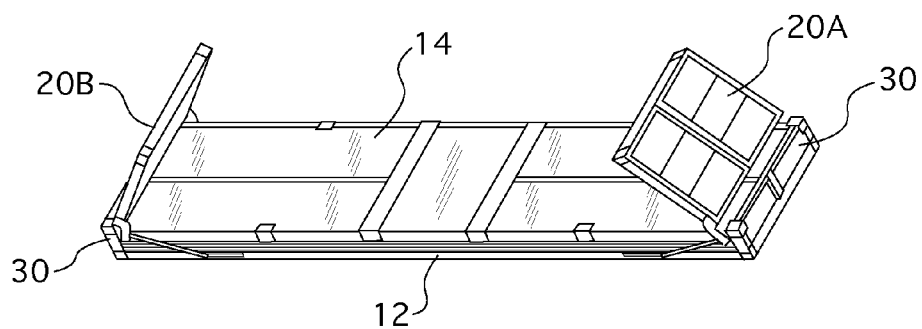
FIG. 29 is a perspective view of the container of FIG. 1 with the side walls fully collapsed position in the first stage of the collapsed configuration.
Figure 30:
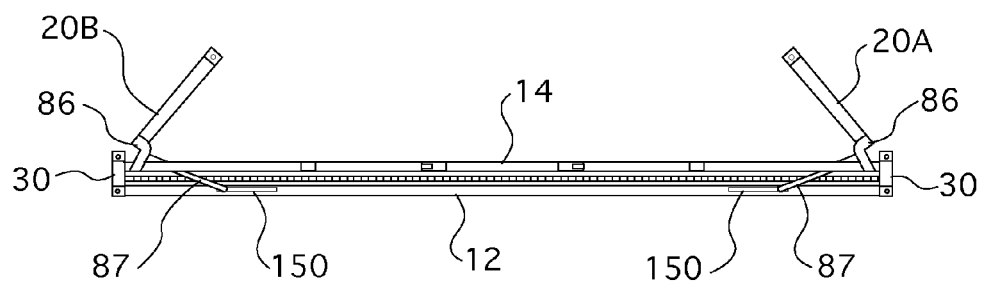
FIG. 30 is a side elevation view of the container of FIG. 29.

FIGS. 29 and 30 illustrate the collapsible shipping container 10 after the upper side panel 16 and lower side panel 18 have been fully collapsed. In this configuration, the interior side of the lower side panels 18 lies on the interior side of the floor 12, and the exterior side of the upper side panels 16 lie on the exterior side of the lower side panels 18. The roof 14 lies on the interior side of the upper side panels 16. All collapsed container sections, floor 12, side panels 16, 18 and roof 14 lie generally flat, preferably as compact as can be tolerated without damaging the component sections.

Once completely lowered, the side-shift hydraulics described above are disconnected at their couplings, preferably quick-connect couplings, and the side-shift hydraulic hoses are connected to the mating connectors, preferably quick-connect couplings, 54 found on the floor of the container 10, using extender hoses if necessary. Using the familiar side-shift hydraulic controls found, for example, on a forklift control panel, the operator now has control of the hydraulic system found onboard the container 10 just as though it was the normal side-shift hydraulic cylinder found on the forklift. As the operator moves the control lever, the onboard hydraulic cylinders 50 are extended, and the end walls 20 fold down to rest upon the roof 14 as described below. The process is similar using the auxiliary hydraulic ports if available, with the exception of using the familiar auxiliary hydraulic controls found on the forklift control panel.

In this stage, the end walls 20A and 20B, which are connected on each side to the floor 12 by J-hinges 86 and levers 87 may be rotated downwardly to the second stage of the collapsed configuration. This movement is controlled by the hydraulic system described above. Levers 87, which are shown in FIG. 28 at the far end of track 150 in floor 12, closest to end wall 20, when in the fully upright position, are moved along their associated track 150 by hydraulic power towards the opposite ends of track 150. The levers 87 pull the curved portion of J-hinge 86 downwardly, causing J-hinge 86 to pivot at the point of connection with plate 78, pulling end walls 20 at the fixed connection at the short end of J-hinge 86 until end walls 20A and 20B are fully collapsed onto roof 14.

When the collapsing operation is completed, the forklift's hydraulic hoses are disconnected from the connectors 54 of the container 10, and if applicable, reconnected to the sideshift couplings of the fork lift. The forklift operator backs the machine away from the container 10, withdrawing the tines, or forks, in the process, and continues on to the next task. To erect the container, the procedure is reversed.

Figure 31:
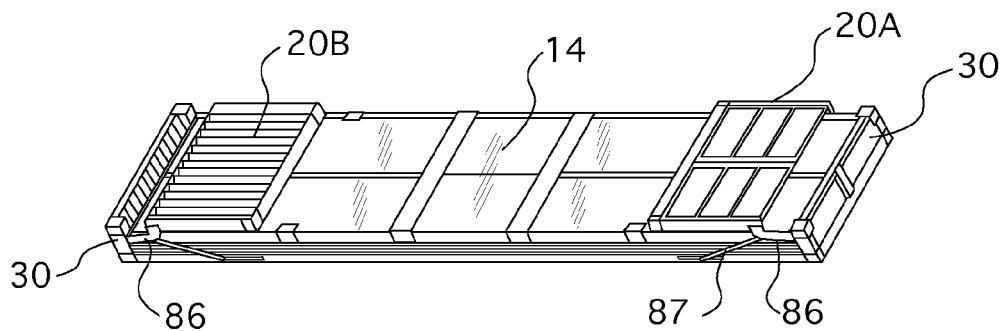
FIG. 31 is a perspective view of the container of FIG. 1 with the upper end wall sections in the fully collapsed second stage of the collapsed configuration.
Figure 32:
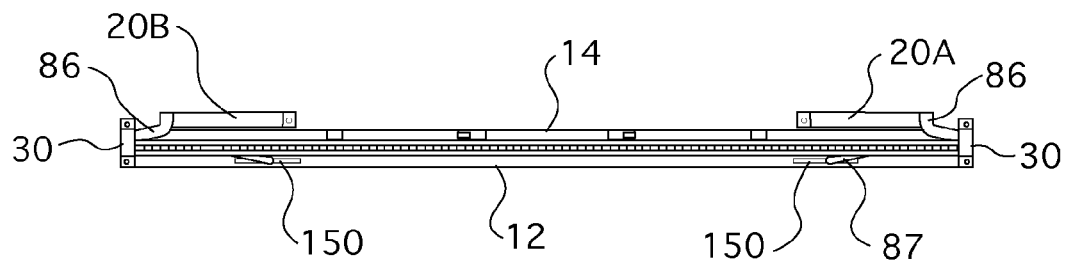
FIG. 32 is a side elevation view of the fully collapsed container of FIG. 31.
Figure 33:
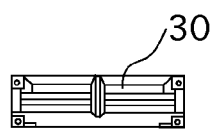
FIG. 33 is an end view of the fully collapsed container of FIG. 31.

FIGS. 31, 32 and 33 illustrate the collapsible shipping container 10 in its fully collapsed second stage of the collapsed configuration. In this configuration, the internal sides of end walls 20 lie generally flat on the exterior of roof 14. The lower end wall portions 30 remain erect. The height of these lower end wall portions 30, preferably, is at least the same as the combined height of the floor 12, collapsed sidewalls 36 and roof 14 and end walls 20 in the fully collapsed second stage of the collapsed configuration. The collapsed container 10 may be lifted, for example, by a crane or hoist, from either the ISO fittings 80 at its bottom corners, or the ISO fittings 82 at the top corners of the corner posts 38 of lower end wall portions 30.

Figure 43:
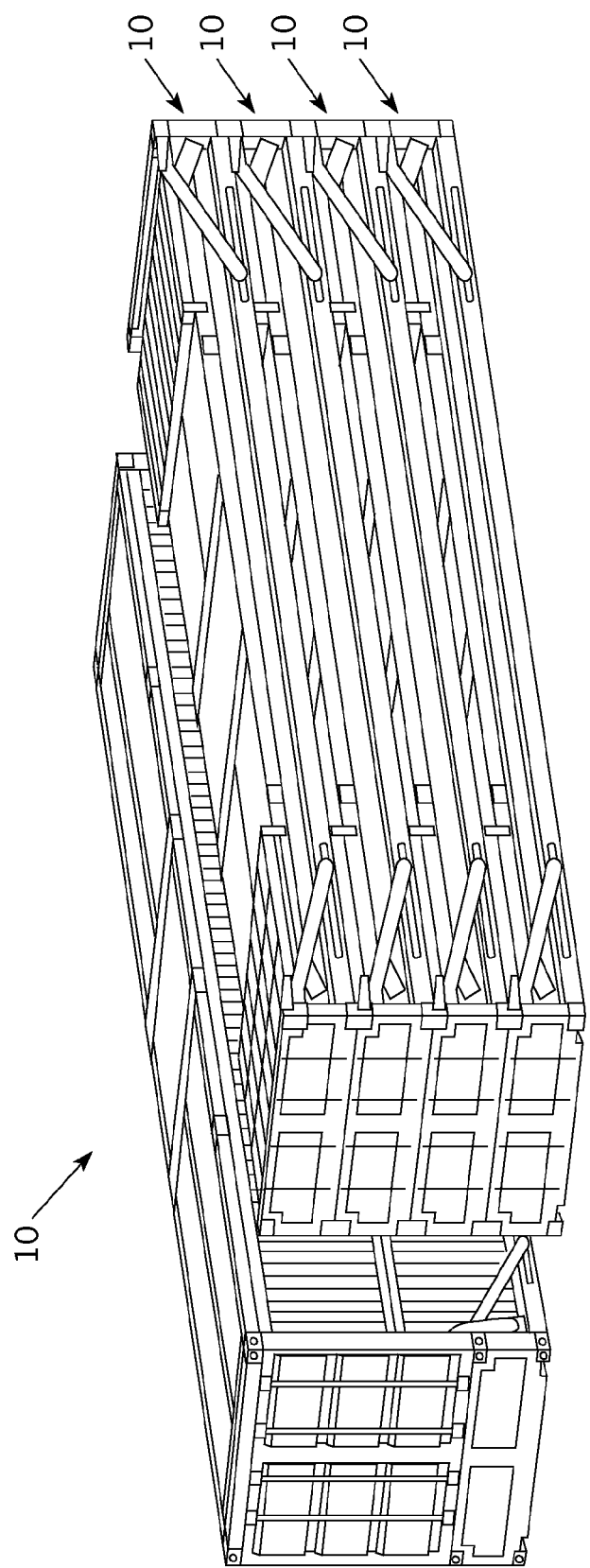

FIG. 43 illustrates a stack of four collapsible shipping containers 10 in their fully collapsed configuration adjacent a fully erect container 10. In one embodiment, as shown in FIG. 43, the height of the lower end wall portions 30 is about one quarter the height of an erect container, minus the height of any inter-container connectors that may optionally be placed between stacked containers to secure the stacked containers together. The stack of four fully collapsed containers preferably is the same height as one fully erect container.

Figure 36:
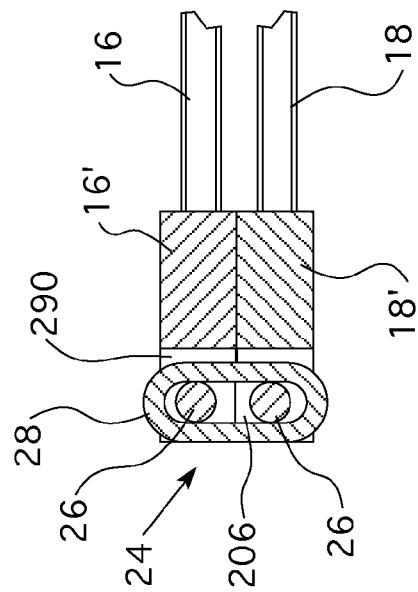
FIG. 36 is a schematic cross-sectional view of the middle side wall hinge of FIG. 23 when the shipping container is fully collapsed.
Figure 35:
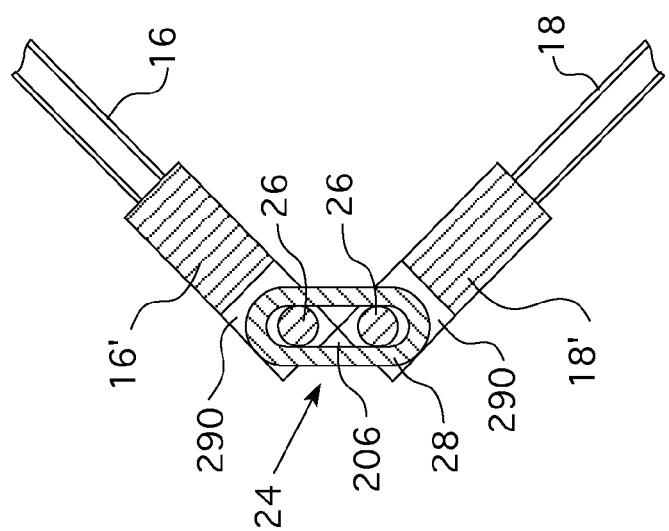
FIG. 35 is a schematic cross-sectional view of the middle side wall hinge of FIG. 23 when the shipping container is partially collapsed.
Figure 34:
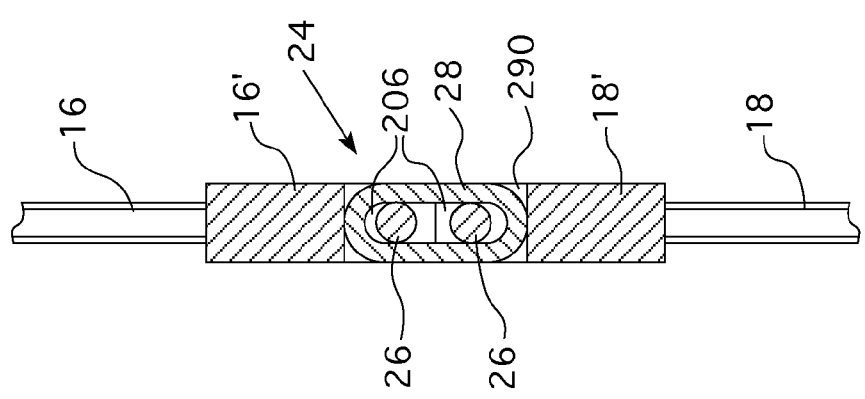
FIG. 34 is a schematic cross-sectional view of the middle side wall hinge of FIG. 23 when the shipping container is fully erect.

FIGS. 34-36 illustrate the movement of hinges 24 relative to upper and lower side panels 16, 18 as they progress from the fully erect to the partially collapsed to the fully collapsed configurations. FIG. 34 illustrates a section cut through one of the middle side hinges 24. Middle side hinge 24 may include a middle hinge shackle 28, which may define an open portion 206. The bottom longitudinal beam of frame 16' of the upper side panel 16 may include a notch, gusset or an angle frame member 290 set into the beam. Likewise, the top longitudinal beam of frame 18' of the lower side panel 18 may include another notch, gusset or angle frame member 290 cut into that beam. The hinge pins 26 are attached to the longitudinal beams of frames 16' and 18' as described above.

When the tines of the fork truck unlock the roof 14 from the ends 20 of the collapsible shipping container 10, and the tines are allowed to move downwardly, the weight of the roof and upper side panel 16 is applied to the hinge pins. A person skilled in the art will recognize that it is then energetically favorable for middle hinge 24 to move inward. When the side panels are in their fully upright position, the pins 26 are in about the middle of shackle 28 to allow the frame sections 16', 18' to rotate relative to each other. As the two sections rotate, the vertical distance between the two hinge pins will increase, as shown in FIG. 35, then decrease, returning to the middle position within shackle 28, as shown in FIG. 36.

FIG. 35 illustrates the configuration of the upper side panel 16, the middle hinge 24 and lower side panel 18 when the collapsible shipping container is partially collapsed.

FIG. 36 illustrates the upper side panel 16, the middle hinge 24 and the lower side panel 18 when the shipping container 10 is fully collapsed. In this configuration, upper side panel 16 lies generally flat relative to and slightly spaced from the top of lower side panel 18.

Figure 37:
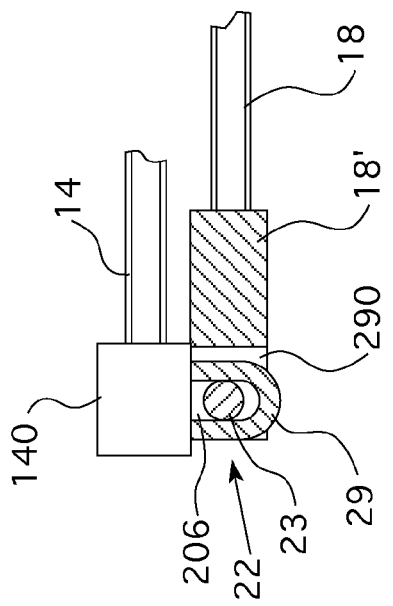
FIG. 37 is a schematic cross-sectional view of the upper hinge of FIG. 24 connecting the top and upper portion of the side wall when the shipping container is fully erect.

FIG. 37 illustrates the upper side wall hinge 22 when the shipping container 10 is in its erect configuration. The upper side wall hinge 22 may include an upper hinge shackle 29, which may be attached at its open side to the perimeter of the roof frame. A notch 290 is cut into the top longitudinal beam of the frame 16' of the upper side panel 16 for placement of the shackle 29. A gusset or angle frame member may be attached to the section cut into the top longitudinal beam. The hinge pins 23 are attached directly, or through the gusset, to the longitudinal beam of frame 16' as described above.

When the tines of the fork truck unlock the roof 14 from the ends 20 of the collapsible shipping container 10 and the tines are allowed to move downwardly, the weight of the roof and upper side panel 16 is on the hinge pins during rotation when the container is being lowered or raised. The inward movement of the side panel moves the pins 23 to the bottom of shackle 29. In the fully upright and fully collapsed positions, the shackle 29 is positioned such that the pins 23 are at about the middle of shackle 29. This effect cooperates with the similar movement of the middle side hinge 24, discussed above.

Figure 38:
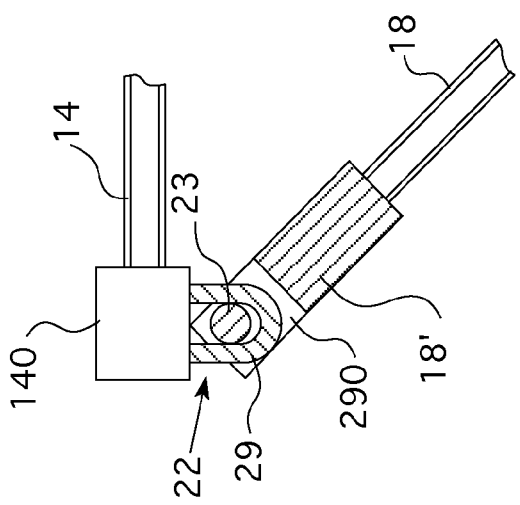
FIG. 38 is a schematic cross-sectional view of the upper hinge of FIG. 24 connecting the top and upper portion of the side wall when the shipping container is partially collapsed.

FIG. 38 illustrates the configuration of the upper side hinge 22 when the collapsible shipping container 10 is partially collapsed.

Figure 39:
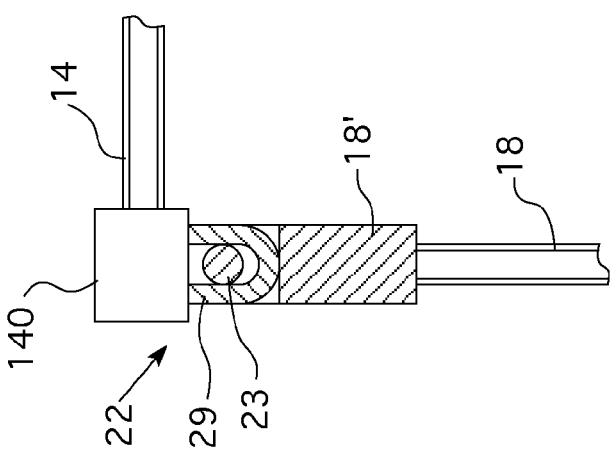
FIG. 39 is a schematic cross-sectional view of the upper hinge of FIG. 24 connecting the top and upper portion of the side wall when the shipping container is fully collapsed.

FIG. 39 illustrates the configuration of the upper side hinge 22 when the collapsible shipping container is fully collapsed. In this configuration, the roof 14 lies generally flat relative to and may be slightly spaced from the upper side panel 16. The corresponding embodiment of hinges 22 which would be positioned at the juncture of the bottom longitudinal beam of frame 18' and floor 12 are similarly structured.

FIGS. 40-42 illustrate an alternative embodiment of middle side wall hinges, 224, when the shipping container 10 is fully erect. In the embodiment shown, middle hinge 224 include a shackle 228, which may be attached to the frames 16' and 18' as described above for hinges 24. Hinge shackle 228 forms a solid structure having two holes through which pins 226 pass.

When the tines of the fork truck unlock the roof 14 from the ends 20 of the collapsible shipping container 10, and the tines are allowed to move downwardly, the weight of the roof 14, upper side panel 16, and lower side panel 18 is primarily carried by the hinge pins. When the container is erect, the load of the roof and its associated parts is carried by the locking members. A person skilled in the art will recognize that it is then energetically favorable for lower side panel 18 to lean inward.

FIG. 41 is an illustration of the middle side wall hinge 224 when the collapsible shipping container 10 is partially collapsed.

FIG. 42 is an illustration of the middle side wall hinge 224 when the shipping container 10 has been fully collapsed.

While the present invention has been described above with reference to a specific configuration, it should be understood that the invention may be otherwise configured within the spirit and scope of the appended claims While the present invention has been illustrated by description of several embodiments and while the illustrative embodiments have been described in considerable detail, it is not the intention of the applicants to restrict or in any way limit the scope of the appended claims to such detail. Additional advantages and modifications may readily appear to those skilled in the art.

We claim:

1. A collapsible container comprising:
   a floor;
   a roof;
   a pair of sidewalls, each of said pair of sidewalls comprising an upper side panel and a lower side panel;
   at least one upper hinge connecting said roof to said upper side panel;
   at least one lower hinge connecting said floor to said lower side panel;
   at least one middle hinge on each said sidewall connecting the lower side panel of each said sidewall to the upper side panel of said sidewall;
   a pair of end walls, wherein each said end wall comprise a lower end wall section connected to the floor and an upper end wall section;
   wherein said floor has a longitudinal axis and two opposing longitudinal sides substantially parallel to the longitudinal axis, each said longitudinal side of said floor having at least one track, and said floor having two opposing transverse ends substantially perpendicular to the longitudinal axis of the floor, and each said lower end wall section being fixed to a different one of said opposite transverse ends of said floor in an upright position relative to said floor;
   said roof comprising at least one engaging member configured for engagement with at least one complementary engaging portion of auxiliary equipment for moving said container between an erect configuration wherein said sidewalls and said end walls are in a fully upright position and a first stage of a collapsed configuration wherein said roof is collapsed onto said sidewalls and said sidewalls are collapsed onto said floor;
   a locking assembly housed in said roof for locking said container in said erect configuration, said locking assembly comprising locking members and at least one releasing member operatively connected to said locking members and in operative contact with said engaging members such that engagement of said engaging members with said at least one engaging portion triggers the releasing member to move said locking members from a locked position to an unlocked position wherein said container is movable into said collapsed configuration;
   a power assembly for moving said upper end wall sections between said erect configuration and a second stage of the collapsed configuration wherein said upper end wall sections are lowered onto said roof following the first stage of the collapsed configuration; and,
   a plurality of hinge assemblies, each hinge assembly operatively connecting each upper end wall section to the power assembly.

2. The container recited in claim 1 wherein each of said lower end wall sections extend upwardly from said floor to a distance greater than the distance of said roof from said floor when said container is in the collapsed configuration.

3. The container recited in claim 1 wherein said floor comprises interior and exterior flooring and said power assembly is housed therebetween.

4. The container recited in claim 1 wherein each said hinge assembly comprises:
   an angled hinge having a first end connection point, a second end connection point and an intermediate connection point;

a lever connected at one end thereof to the intermediate connection point and slidably connected at the other end thereof to the track, said lever being further operatively connected to said power assembly; and, a mount fixed to at least one of the lower end wall section and the floor;

said second connection point being pivotally connected to said mount and said first end connection point being connected to said upper end wall section.

5. The container recited in claim 4 wherein said power assembly has power supply lines connected for delivery of power to said lever to move said lever in a desired direction along said track, thereby translating such movement through said angled hinge to said upper end wall section.

6. The container recited in claim 5 wherein said power assembly is self-contained within said container.

7. The container recited in claim 6 wherein said power assembly comprises a fuel powered motor.

8. The container recited in claim 6 wherein said power assembly comprises an electric motor.

9. The container recited in claim 6 wherein said power assembly comprises a battery powered motor.

10. The container recited in claim 5 wherein said power assembly has at least one pair of connectors for connecting to an external source of power.

11. The container recited in claim 10 wherein said external source of power is supplied by auxiliary equipment having power lines releasably connectable to said connectors of said power assembly.

12. The container recited in claim 11 wherein said auxiliary equipment is a fork lift.

13. The container recited in claim 11 wherein said external source of power is selected from the group consisting of hydraulic, pneumatic, electronic, fossil fuel, plant-based fuel, solar, electromagnetic and chemical power.

14. The container recited in claim 5 wherein there are four hinge assemblies, one on each side of each said upper end wall section, said power assembly farther comprising:

a pair of cylinders mounted on said floor, each said cylinder being connected to a pair of power supply lines, a first one of said pair of power supply lines being disposed on a first longitudinal side of said floor for connection to said lever of a one of said hinge assemblies, and a second one of said pair of power supply lines being disposed on a second longitudinal side of said floor for connection to said lever of a different one of said hinge assemblies.

15. The container recited in claim 14 wherein said power assembly has at least one pair of connectors, each connector of said pair of connectors for connecting each cylinder to an external source of power.

16. The container recited in claim 15 wherein said external source of power is selected from the group consisting of hydraulic, pneumatic, electronic, fossil fuel, plant-based fuel, solar, electromagnetic and chemical power.

17. The container recited in claim 1 further comprising four fittings for releasable connection to auxiliary equipment for moving said container, one said fitting being disposed at each corner of said upper end wall sections.

18. The container recited in claim 1 further comprising four fittings for releasable connection to auxiliary equipment for moving said container, one said fitting being disposed at each top corner of said lower end wall sections.

19. The container recited in claim 1 further comprising elastomeric seals for sealing the container against moisture when in said erect configuration.

20. A collapsible container comprising:
a floor;
a roof,
a pair of sidewalls, each of said pair of sidewalls comprising an upper side panel and a lower side panel;
at least one upper hinge connecting said roof to said upper side panel;
at least one lower hinge connecting said floor to said lower side panel;
at least one middle hinge on each said sidewall connecting the lower side panel of each said sidewall to the upper side panel of said sidewall;
a pair of end walls;
said roof comprising at least one engaging member configured for engagement with at least one complementary engaging portion of auxiliary equipment for moving said container between an erect configuration wherein said sidewalls and said end walls are in a fully upright position and a first stage of a collapsed configuration wherein said roof is collapsed onto said sidewalls and said sidewalls are collapsed onto said floor;
a locking assembly housed in said roof for locking said container in said erect configuration, said locking assembly comprising locking members and at least one releasing member operatively connected to said locking members and in operative contact with said engaging members such that engagement of said engaging members with said at least one engaging portion triggers the releasing member to move said locking members from a locked position to an unlocked position wherein said container is movable into said collapsed configuration, wherein said locking members are biased toward a locked position.

21. The container recited in claim 20 wherein said locking members, in said locked position, engage said end walls.

22. The container recited in claim 20 further comprising a power assembly for moving said upper end wall sections between said erect configuration and a second stage of the collapsed configuration wherein said upper end wall sections are lowered onto said roof following the first stage of the collapsed configuration.

23. The container recited in claim 20 further comprising a plurality of hinge assemblies, each hinge assembly operatively connecting each upper end wall section to the power assembly.

24. The container recited in claim 23 wherein each said hinge assembly comprises:

an angled hinge having a first end connection point, a second end connection point and an intermediate connection point;

a lever connected at one end thereof to the intermediate connection point and slidably connected at the other end thereof to the track, said lever being further operatively connected to said power assembly; and, a mount fixed to at least one of the lower end wall section and the floor;

said second connection point being pivotally connected to said mount and said first end connection point being connected to said upper end wall section.

25. A collapsible container comprising:
a floor;
a roof;
a pair of sidewalls, each of said pair of sidewalls comprising an upper side panel and a lower side panel;
at least one upper hinge connecting said roof to said upper side panel;
at least one lower hinge connecting said floor to said lower side panel;

at least one middle hinge on each said sidewall connecting the lower side panel of each said sidewall to the upper side panel of said sidewall;

a pair of end walls;

said roof comprising at least one engaging member configured for engagement with at least one complementary engaging portion of auxiliary equipment for moving said container between an erect configuration wherein said sidewalls and said end walls are in a fully upright position and a first stage of a collapsed configuration wherein said roof is collapsed onto said sidewalls and said sidewalls are collapsed onto said floor, wherein said roof has a longitudinal axis and said engaging member comprises at least one elongate passage spanning said roof in a direction transverse to the longitudinal axis of said roof and, a locking assembly housed in said roof for locking said container in said erect configuration, said locking assembly comprising locking members and at least one releasing member operatively connected to said locking members and in operative contact with said engaging members such that engagement of said engaging members with said at least one engaging portion triggers the releasing member to move said locking members from a locked position to an unlocked position wherein said container is movable into said collapsed configuration.

26. The container recited in claim 25 wherein said releasing member protrudes into said at least one elongate passage.

27. The container recited in claim 25 wherein said elongate passage has a rectangular cross-section for receiving the engaging portion of the auxiliary equipment.

28. The container recited in claim 25 wherein said locking assembly has a pair of releasing members, each releasing member comprising a plunger protruding into said elongate passage connected by a biasing member to a connector arm, said connector arm being pivotally connected to a pivot arm, and said pivot arm being pivotally connected to said locking member, said locking member, in said locked position, being in engagement with one of said end walls.

29. The container recited in claim 28 wherein there are two elongate passages, each elongate passage having at least one opening along its length through which a convexly curved portion of said plunger protrudes.

30. The container recited in claim 25 wherein said at least one middle hinge comprises two substantially parallel and non collinear pins, one pin being joined to said upper side panel of said side wall and the other pin being joined to said lower side panel of said side wall.

31. The container recited in claim 30 wherein said at least one middle hinge further comprises a housing forming, in cross-section, an elongate oval through which said two pins pass and in which said pins move freely to allow said upper and lower side panels to move between the erect configuration and the collapsed configuration.

32. The container recited in claim 25 further comprising a power assembly for moving said upper end wall sections between said erect configuration and a second stage of the collapsed configuration wherein said upper end wall sections are lowered onto said roof following the first stage of the collapsed configuration.

33. The container recited in claim 25 further comprising a plurality of hinge assemblies, each hinge assembly operatively connecting each upper end wall section to the power assembly.

34. The container recited in claim 33 wherein each said hinge assembly comprises:

an angled hinge having a first end connection point, a second end connection point and an intermediate connection point;

a lever connected at one end thereof to the intermediate connection point and slidably connected at the other end thereof to the track, said lever being further operatively connected to said power assembly; and a mount fixed to at least one of the lower end wall section and the floor;

said second connection point being pivotally connected to said mount and said first end connection point being connected to said upper end wall section.

35. A collapsible container comprising:

a floor;

a roof;

a pair of sidewalls, each of said pair of sidewalls comprising an upper side panel and a lower side panel;

at least one upper hinge connecting said roof to said upper side panel;

at least one lower hinge connecting said floor to said lower side panel;

at least one middle hinge on each said sidewall connecting the lower side panel of each said sidewall to the upper side panel of said sidewall;

a pair of end walls;

said roof comprising at least one engaging member configured for engagement with at least one complementary engaging portion of auxiliary equipment for moving said container between an erect configuration wherein said sidewalls and said end walls are in a fully upright position and a first stage of a collapsed configuration wherein said roof is collapsed onto said sidewalls and said sidewalls are collapsed onto said floor;

a locking assembly housed in said roof for locking said container in said erect configuration, said locking assembly comprising locking members and at least one releasing member operatively connected to said locking members and in operative contact with said engaging members such that engagement of said engaging members with said at least one engaging portion triggers the releasing member to move said locking members from a locked position to an unlocked position wherein said container is movable into said collapsed configuration, wherein said at least one upper hinge, said at least one lower hinge, and said at least one middle hinge are so configured that said shipping container tends to collapse due to gravity when said locking members are disposed in said unlocked position.

36. The container recited in claim 35 further comprising four fittings for releasable connection to auxiliary equipment for moving said container, one said fitting being disposed at each corner of said floor.

\* \* \* \* \*